(12) United States Patent
Baron et al.

(10) Patent No.: US 10,219,219 B2
(45) Date of Patent: Feb. 26, 2019

(54) METHOD FOR CONNECTING A NETWORK RECEIVER WITH ONE OR MORE DEVICES WHILE MINIMIZING POWER USAGE

(71) Applicant: Microsoft Technology Licensing, LLC, Redmond, WA (US)

(72) Inventors: Andrew Baron, Redmond, WA (US); Vishal Mhatre, Redmond, WA (US); Gianluigi Nusca, Seattle, WA (US); Andrew Cunningham, Redmond, WA (US); Matthew Durak, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/603,068

(22) Filed: May 23, 2017

(65) Prior Publication Data
US 2018/0213478 A1    Jul. 26, 2018

Related U.S. Application Data

(60) Provisional application No. 62/448,756, filed on Jan. 20, 2017.

(51) Int. Cl.
*H04W 52/02* (2009.01)
*H04W 4/80* (2018.01)
(Continued)

(52) U.S. Cl.
CPC ......... *H04W 52/0229* (2013.01); *H04W 4/80* (2018.02); *H04W 8/005* (2013.01); *H04W 88/06* (2013.01)

(58) Field of Classification Search
USPC .................... 455/41.1–41.3, 343.1–343.6
See application file for complete search history.

(56) References Cited

U.S. PATENT DOCUMENTS

| 9,351,154 | B1 | 5/2016 | Steve | |
| 2012/0040639 | A1* | 2/2012 | Brisebois | H04W 48/02 455/408 |

(Continued)

FOREIGN PATENT DOCUMENTS

| EP | 1895713 A1 | 3/2008 |
| EP | 2557860 A1 | 2/2013 |
| WO | 2013184110 A1 | 12/2013 |

OTHER PUBLICATIONS

"About Wi-Fi Sense", https://web.archive.org/web/20161030082539/ https:/privacy.microsoft.com/en-US/windows-10-about-wifi-sense, Published on: Oct. 30, 2016, 7 pages.

(Continued)

*Primary Examiner* — Fayyaz Alam

(57) ABSTRACT

The disclosure generally relates to identifying a Bluetooth Low Energy (BTLE) enabled Wi-Fi network receiver and automatically connecting to the BTLE-enabled network receiver via a Wi-Fi signal without using a Wi-Fi scanning operation. In some aspects, an initial connection may be established between the network receiver and a BTLE-enabled device during which the Wi-Fi scanning operation of the device is disabled. Thereafter, the device may automatically detect the BTLE-enabled network receiver via BTLE signal and automatically connect to the network receiving using a Wi-Fi signal without using the Wi-Fi scanning operation. In this way, the battery life of the device may be conserved by disabling the Wi-Fi scanning operation. Although the electronic device may be within the Wi-Fi range of the network receiver, the device may not search for or connect to the network receiver if it is outside of the BTLE range of the network receiver.

20 Claims, 15 Drawing Sheets

(51) Int. Cl.
 *H04W 8/00* (2009.01)
 *H04W 88/06* (2009.01)

(56) References Cited

U.S. PATENT DOCUMENTS

| | | |
|---|---|---|
| 2013/0017816 A1 | 1/2013 | Talty et al. |
| 2013/0178160 A1 | 7/2013 | Wang |
| 2015/0319555 A1 | 11/2015 | Cordeiro et al. |
| 2016/0081019 A1 | 3/2016 | Pujari et al. |
| 2016/0112947 A1 | 4/2016 | Sahoo et al. |
| 2016/0127996 A1* | 5/2016 | Patil ................. H04W 48/16 370/311 |
| 2016/0183317 A1 | 6/2016 | Shao et al. |
| 2016/0234301 A1 | 8/2016 | Qi et al. |
| 2016/0241726 A1 | 8/2016 | Okamura et al. |
| 2016/0353233 A1 | 12/2016 | Yong et al. |

OTHER PUBLICATIONS

"International Search Report and Written Opinion Issued in PCT Application No. PCT/US18/013693", dated Apr. 16, 2018, 12 Pages.

\* cited by examiner

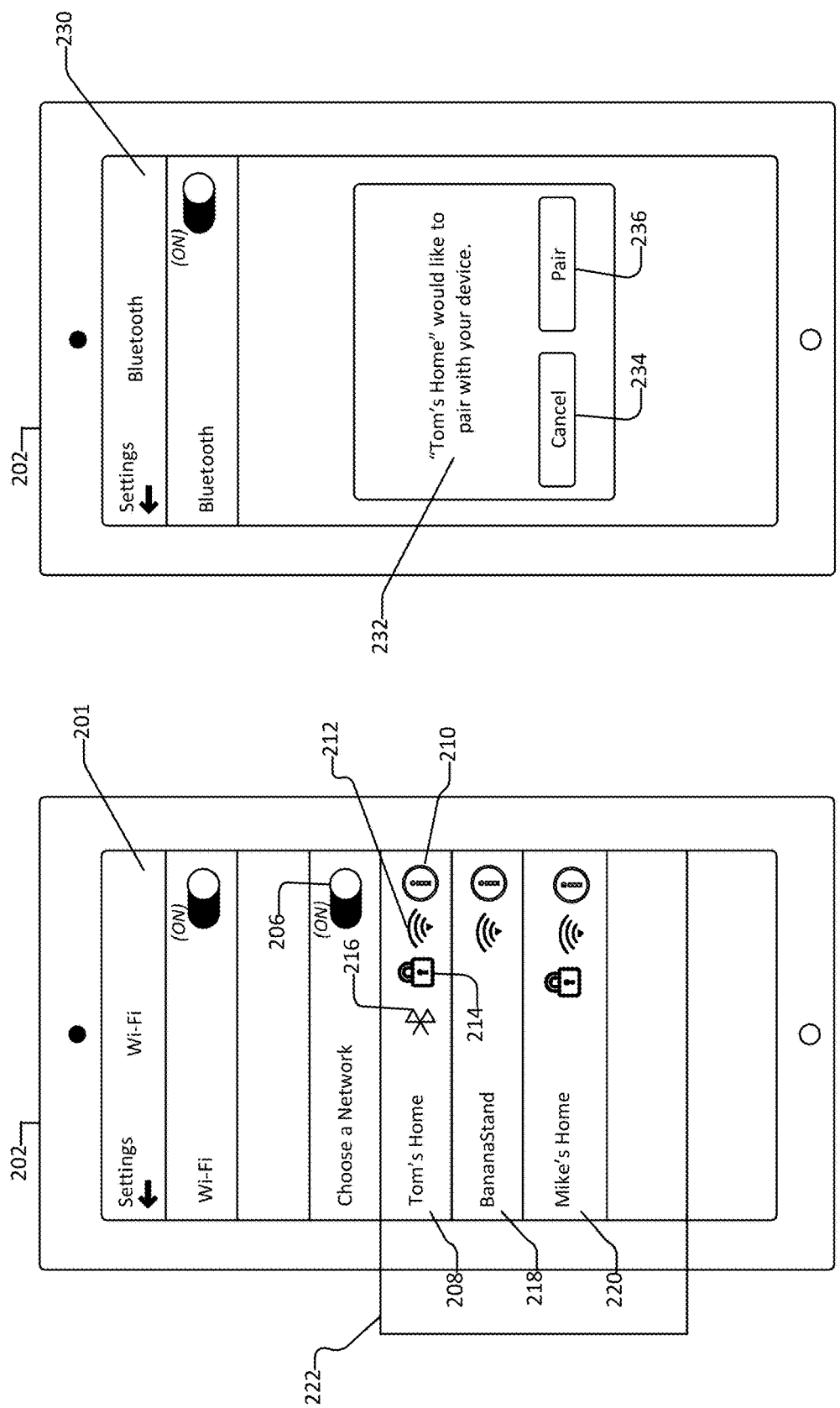

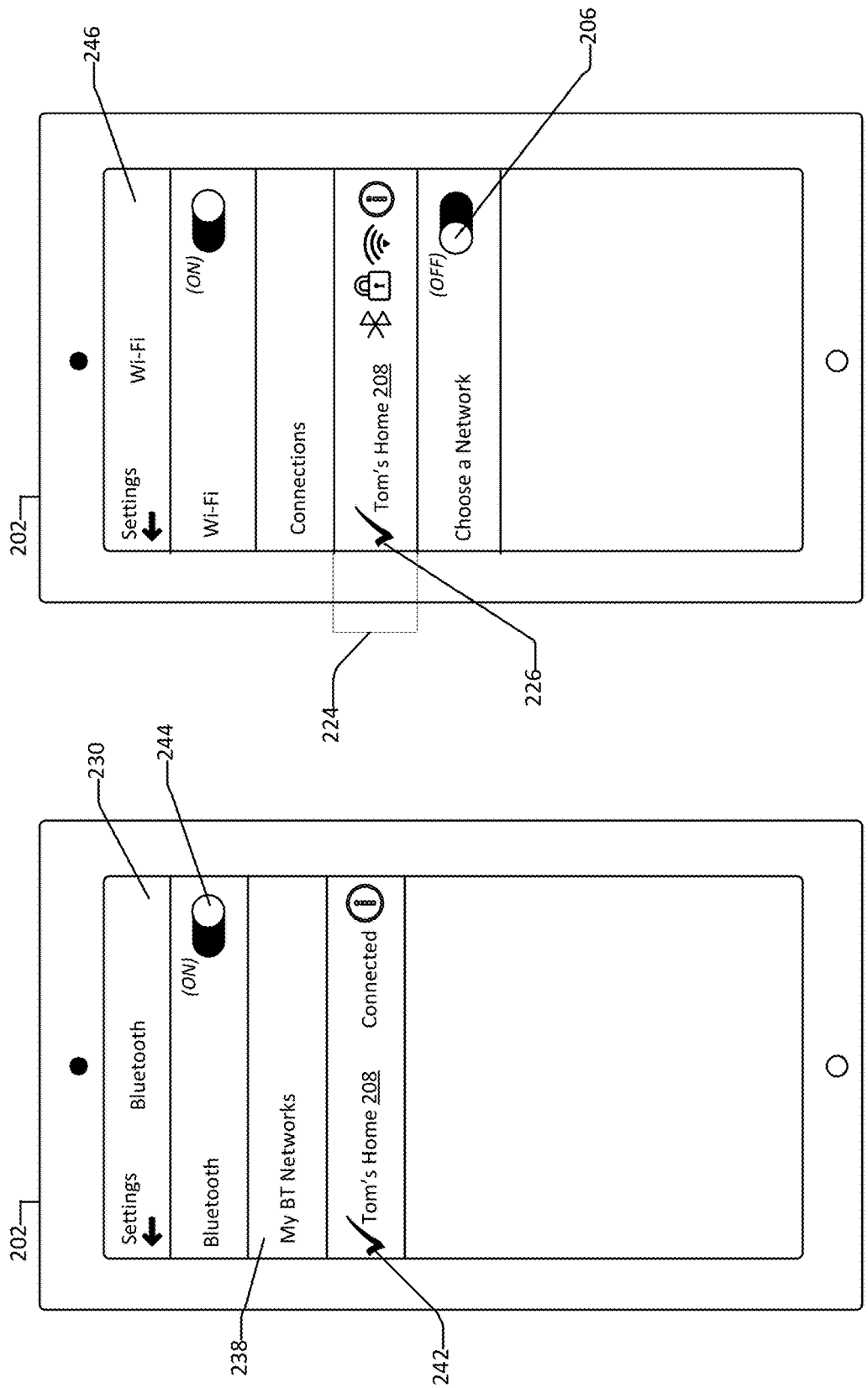

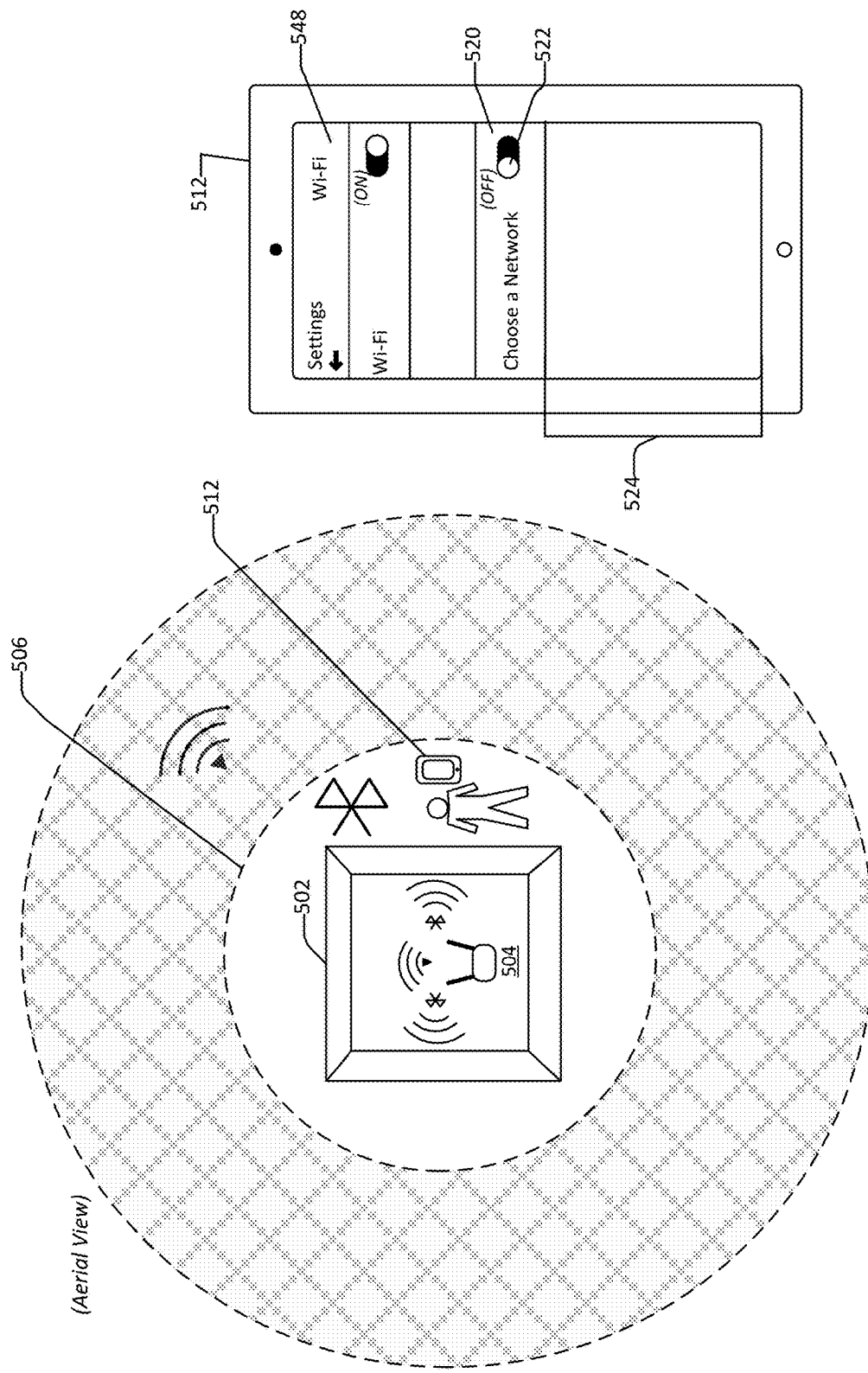

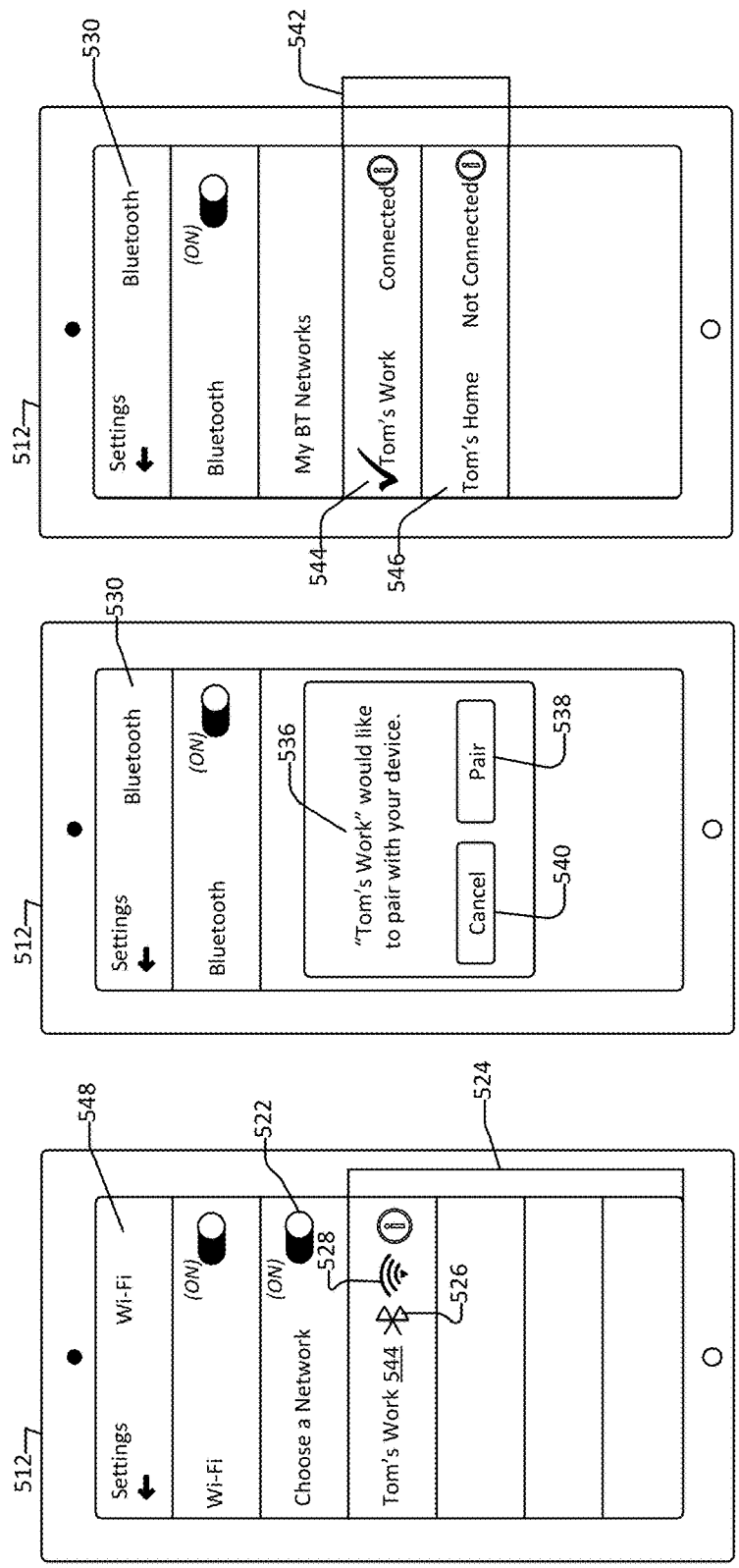

METHOD FOR CONNECTING A NETWORK RECEIVER WITH ONE OR MORE DEVICES WHILE MINIMIZING POWER USAGE

CROSS-REFERENCE TO RELATED APPLICATIONS

This application claims the benefit of U.S. Provisional Application Ser. No. 62/448,756, filed on Jan. 20, 2017, the entire disclosure of which is hereby incorporated herein by reference.

BACKGROUND

The more functionality users pack into their electronic devices, the more power their electronic devices require. Poor battery life is a leading contributor to customer dissatisfaction. One of the biggest consumers of electronic device power is Wi-Fi scanning. Most Wi-Fi-enabled devices have default settings that continuously scan for geographically proximate Wi-Fi networks. In some devices, the continuous scanning for Wi-Fi networks persists even after the device has successfully connected to a Wi-Fi network. This results in an unnecessary drain of the device's battery life. Wi-Fi scanning is costly because it operates on high radio frequencies (e.g., 3.6, 5 GHz) and supports higher bandwidth. Even so, device connections to Wi-Fi networks are beneficial. For example, Wi-Fi has a maximum transmission range of 32 meters indoors and up to 95 meters outdoors. Because of its broad transmission range, faster connection, and larger bandwidth capabilities, Wi-Fi is optimal for operating full-scale networks that transfer and receive large amounts of data (e.g., Internet data).

However, device connection to Wi-Fi networks also involves disadvantages. For example, a home Internet network using a Wi-Fi signal connection often broadcasts beyond the boundary lines of the home. As a result, neighbors may become aware of this network and attempt to access it without authorization. Furthermore, when a user leaves home, the user's electronic device may unnecessarily remain connected to the home network for a period of time after traversing the property line of the home. Similarly, when the user returns home from work, the device may attempt to unnecessarily establish a connection with the home network before the user is within the property line of the home. When the user is outside of the property line of the home, the periods of time during which the user's device is attempting to connect to the home network via Wi-Fi scanning can cause a significant loss of battery life to the user's electronic device. Furthermore, the scanning and pairing process between a device and a network receiver (e.g., Internet router/modem) does not require the transmission of large amounts of data. Thus, using Wi-Fi frequencies for the scanning and pairing process is unnecessary and needlessly consumes power.

It is with respect to these and other general considerations that example aspects, systems, and methods have been described. Also, although relatively specific problems have been discussed, it should be understood that the examples should not be limited to solving the specific problems identified in the background.

SUMMARY

When compared to a Wi-Fi connection, Bluetooth (BT) operates on a lower radio frequency (2.4 GHz), has lower bandwidth capabilities, and has a maximum transmission range of only about 10 meters. Although BT has a smaller transmission range than Wi-Fi, many electronic device users are rarely further than 10 meters away from their Internet router/modem. Thus, using Bluetooth Low Energy (BTLE) solutions to automatically connect to known networks can significantly improve the battery life of a user's electronic device.

The disclosure generally relates to systems and methods for detecting a Bluetooth Low Energy (BTLE) enabled Wi-Fi network receiver (hereinafter "network receiver") via a BTLE signal on a BTLE-enabled device without utilizing a Wi-Fi scanning operation. In response to detecting the network receiver via the BTLE signal, the BTLE-enabled device may automatically connect to the network receiver via a Wi-Fi signal. In this way, automatic connection to a network receiver via a Wi-Fi signal may be triggered based on detecting the network receiver via a BTLE signal, thus eliminating the need to detect the network receiver using the energy-draining Wi-Fi scanning function. Although the electronic device may be within the Wi-Fi range of the network receiver, the device may not search for or connect to the network receiver if it is outside of the BTLE range of the network receiver. Thus, once the device is outside of the BTLE range of the network receiver, the battery life of the device is preserved.

In an aspect, a method of connecting a device to a network receiver using Bluetooth Low Energy (BTLE) is provided. The method includes preconfiguring the device to pair with the network receiver via a Bluetooth protocol and, in response to preconfiguring the device to pair with the network receiver, automatically disabling a Wi-Fi scanning operation of the device. While the Wi-Fi scanning operation is disabled, the method further includes detecting the network receiver via the Bluetooth protocol and, in response to detecting the network receiver, establishing a Wi-Fi connection between the device and the network receiver.

In another aspect, a device for connecting to an auto-connect capable network receiver using a low energy signal is provided. The device includes at least one processing unit and at least one memory encoding computer executable instructions that, when executed by the at least one processing unit, cause the at least one processing unit to perform a method. The method includes preconfiguring the device to pair with a network receiver via the low energy signal, where the low energy signal of the network receiver is associated with a geographic range. In response to preconfiguring the device to pair with the network receiver, the method further includes automatically disabling a Wi-Fi scanning operation of the device and, while the Wi-Fi scanning operation is disabled, detecting the network receiver via the low energy signal. In response to detecting the network receiver, the method also includes establishing a Wi-Fi connection between the device and the network receiver.

In yet another example, a computer storage medium is provided. The computer storage medium encodes computer executable instructions that, when executed by the at least one processor, perform a method. The method includes preconfiguring a device to pair with a network receiver via a low energy signal, where the low energy signal of the network receiver is associated with a geographic range. In response to preconfiguring the device to pair with the network receiver, the method further includes automatically disabling a Wi-Fi scanning operation of the device and, while the Wi-Fi scanning operation is disabled, detecting the network receiver via the low energy signal. In response to detecting the network receiver, the method also includes establishing a Wi-Fi connection between the device and the network receiver.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 2A illustrates an example of a Wi-Fi settings page on a device screen before the device is successfully paired with the network receiver.

FIG. 2B illustrates an example of a Bluetooth settings page on a device screen receiving a Bluetooth pairing request message from the network receiver.

FIG. 2C illustrates an example of a Bluetooth settings page on a device screen after the Bluetooth pairing request message from the network receiver has been accepted.

FIG. 2D illustrates an example of a Wi-Fi settings page on a device screen after the Bluetooth pairing request message from the network receiver has been accepted.

FIG. 5A illustrates an example of an electronic device located within a network receiver's Bluetooth Low Energy signal range.

FIG. 5B illustrates an example of a Wi-Fi settings page on a device screen after the device has already been connected with a first network receiver and before the device is connected to a second network receiver.

FIG. 5C illustrates an example of a Wi-Fi settings page on a device screen after the "Choose a Network" option is turned ON.

FIG. 5D illustrates an example of a Bluetooth settings page on a device screen receiving a Bluetooth pairing request message from the second network receiver.

FIG. 5E illustrates an example of a Bluetooth settings page on a device screen after the Bluetooth pairing request message from the second network receiver has been accepted.

DETAILED DESCRIPTION

Figure 1A:
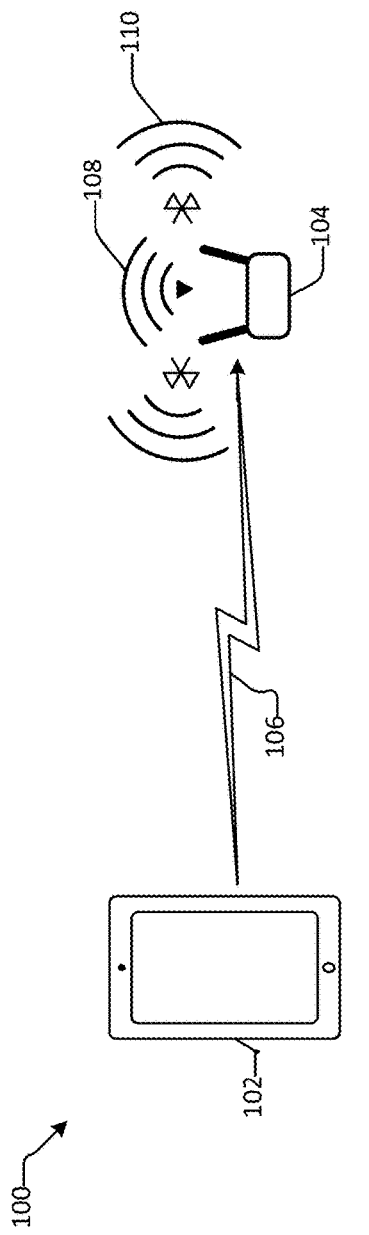
FIG. 1A illustrates a method for initially connecting a device to a network receiver.

In the following detailed description, references are made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or devices. Accordingly, example aspects may take the form of a hardware implementation, a software implementation, or an implementation combining software and hardware aspects. The following detailed description is therefore not to be taken in a limiting sense, and the scope of the present disclosure is defined by the appended claims and their equivalents.

The more functionality that users pack into their electronic devices (also referred to herein as "devices"), the more power their electronic devices require. The degradation of an electronic device's battery life has consistently been one of the largest contributors to customer dissatisfaction. Two of the most significant consumers of battery power are persistent Wi-Fi scanning and connecting to network receivers via energy-hungry Wi-Fi signals. Due to stronger signals and higher frequencies, an electronic device that is persistently scanning for a Wi-Fi network may needlessly attempt to connect to a network receiver that is geographically further away than other network receivers. Since many devices automatically scan for nearby Wi-Fi networks, an electronic device with automatic and persistent Wi-Fi scanning may constantly be losing battery life at a much faster rate than an electronic device that has the Wi-Fi scanning operation turned OFF. Prior methods and devices have focused on providing users with options to manually turn OFF and turn ON Wi-Fi scanning capabilities. Unfortunately, these methods and devices have neglected to optimize the user experience by automating such tedious and inconvenient processes. Among other benefits, the methods and systems disclosed herein may be utilized to prolong electronic device battery life by detecting network receivers via a BTLE signal and automatically triggering connections to the network receivers via Wi-Fi signals, without utilizing energy-hungry Wi-Fi scanning operations. Additionally, upon establishing a successful pairing between an electronic device and a BTLE-enabled network receiver, the electronic device's Wi-Fi scanning operation may be disabled, further preserving the battery power of the electronic device.

In one example aspect, a user selection may be received to connect a BTLE-enabled device to a BTLE-enabled network receiver via a Wi-Fi Direct (Wi-Fi P2P) connection. In some examples, the user selection may include a user request to initiate an initial connection. In other examples, the user selection may include a user confirmation of a prompt to initiate a connection. Other examples are possible and the described examples should not be considered limiting. In some cases, during an initial connection, information is exchanged between the device and the network receiver, including BTLE compatibility information. Based on the information, the device may detect that the network receiver is BTLE-enabled, and a Bluetooth pair request message may pop-up on the screen of the user's device. If the user accepts the Bluetooth pair request from the network receiver, then subsequent detections of the network receiver may be achieved via an energy-efficient BTLE signal, rather than an energy-hungry Wi-Fi scanning operation.

In another example aspect, after the electronic device has been paired via a BTLE signal to the BTLE-enabled network receiver, the electronic device's Wi-Fi scanning operation may be disabled. In this case, upon pairing the electronic device with the network receiver, the electronic device may "remember" the network receiver and, although the Wi-Fi scanning operation remains disabled, the electronic device may subsequently detect the network receiver via a BTLE signal and automatically establish a Wi-Fi connection to the network receiver. In this way, the Wi-Fi scanning operation may remain disabled to preserve the electronic device's battery life, but the electronic device may still establish Wi-Fi connections with pre-configured (e.g., previously paired) network receivers. In some cases, the electronic device's Wi-Fi scanning operation may be disabled indefinitely upon a successful pairing between the electronic device and a BTLE-enabled network receiver. Even so, the user may manually turn ON the Wi-Fi scanning operation when the electronic device is not within the BTLE range of a pre-configured BTLE-enabled network receiver in order to scan for alternative nearby Wi-Fi networks.

A BTLE-enabled device may store (or "remember") several BTLE-enabled network receivers for future connections. In one example aspect, a user may have a BTLE-enabled network receiver at the user's home residence and another BTLE-enabled network receiver at the user's work office. In some cases, a device may be initially paired with each of the BTLE-enabled network receivers via a Wi-Fi Direct connection and/or a BTLE signal. For example, a pairing may involve a user selection to connect to a particular network receiver. After the initial pairing, the electronic device may automatically connect to the network receiver via a Wi-Fi signal without utilizing a Wi-Fi scanning operation. In this case, a user may travel to and from work without needing to actively scan for nearby Wi-Fi signals because the user's electronic device(s) were initially paired to the user's home BTLE-enabled network receiver and the user's work BTLE-enabled network receiver. Thus, the user's electronic devices may subsequently detect these BTLE-enabled network receivers via energy-efficient BTLE signals, rather than using energy-hungry Wi-Fi scanning operations. As a result, the battery life of the user's electronic devices may be significantly extended. Additionally, further aspects allow a user to remove (e.g., "forget") BTLE-enabled network receivers from the user's electronic devices. A user may also turn ON or OFF the BTLE and Wi-Fi capabilities of the device and/or the network receiver at any time. It is with respect to these and other general considerations that example aspects have been made.

FIG. 1A illustrates a system 100 for initially pairing a device to a network receiver. The system includes a BTLE-enabled device 102 that receives a Wi-Fi signal 108 and a BTLE signal 110 from a BTLE-enabled network receiver 104. The device 102 may then transmit a connection request 106 to the network receiver 104. In aspects, both the network receiver and the device are BTLE-enabled in order to establish a pairing between the device and the network receiver via BTLE signals 110.

Figure 1B:
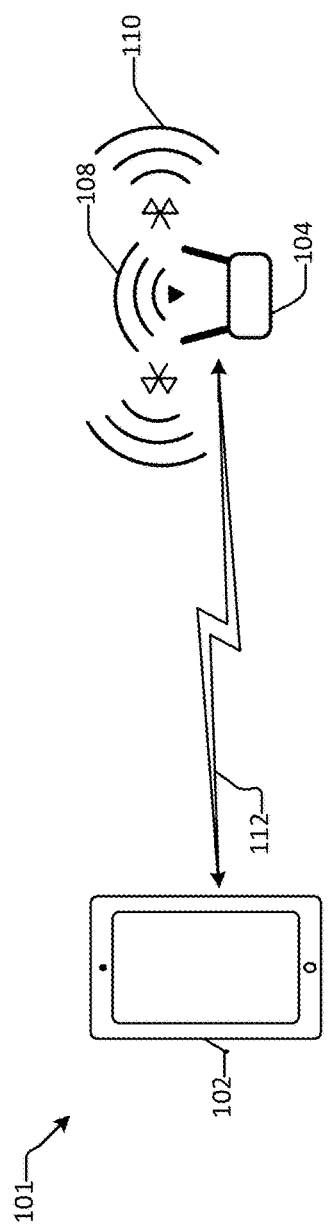
FIG. 1B illustrates a method for exchanging data and verification information between a device and a network receiver.

FIG. 1B illustrates a system 101 for exchanging data and verification information between a device 102 and a network receiver 104. In some aspects, before a successful pairing can be established between the device 102 and the network receiver 104, data 112 may be exchanged between the device 102 and the network receiver 104. For example, the data 112 that is exchanged between the device 102 and the network receiver 104 may comport with the latest Bluetooth Core Specifications (currently, Version 5). During the pairing process between the device 102 and the network receiver 104, data 112 may include identification information that is exchanged. Additionally, the data 112 may encompass compatibility information regarding BTLE capabilities of the network receiver 104 and the device 102. In further aspects, the device 102 may verify that the network receiver 104 is BTLE compatible and the network receiver 104 may verify that the device 102 is BTLE compatible. Additionally, security steps that are unique to the Bluetooth protocol may be performed. For instance, the data 112 may also encompass a shared secret known as a link key. A link key may be defined as a cryptographically unique identifier (e.g., alphanumeric password) that is shared only between the device 102 and the network receiver 104. A device and a network receiver that share the same link key may be automatically cryptographically authenticated in subsequent connections. This allows for a device 102 to subsequently automatically detect a network receiver 104 via Bluetooth Low Energy (BTLE) signals 110.

Upon a successful exchange of data 112, the device 102 and network receiver 104 may successfully pair via BTLE signals 110. Once paired, the device 102 may store at least some of the data 112 received from the network receiver 104, and the network receiver 104 may store at least some of the data 112 received from the device 102. This stored data 112 may be used by both the device 102 and network receiver 104 for subsequent automatic detections via BTLE signals 110. After the device 102 subsequently detects the network receiver 104, an automatic Wi-Fi connection may be triggered between the device 102 and the network receiver 104 without requiring a Wi-Fi scanning operation to be enabled on device 102.

It should be appreciated that the systems 100 and 101 for initially pairing device 102 to network receiver 104 may occur in various orders. For instance, the determination of BTLE capability may occur before any device identification information is transmitted. In other instances, the determination for BTLE capabilities may occur after the device identification information is transmitted.

In some aspects, device 102 may represent a handheld device, a portable device, a tablet, a laptop computer, a desktop computer, a gaming console, and other electronic devices with BTLE capabilities. Additionally, in some aspects, network receiver 104 may represent a wireless router, an Ethernet router, a network adapter, a router/modem combination device, a Miracast device, a Chromecast device, an AirPlay device, a range extender device, a wireless dock, and the like.

As should be appreciated, the various methods, devices, components, etc., described with respect to FIG. 1A and FIG. 1B are not intended to limit systems 100 and 101 to being performed by the particular components described. Accordingly, additional topology configurations may be used to practice the methods and systems herein and/or components described may be excluded without departing from the methods and systems disclosed herein.

FIG. 2A illustrates an example of a Wi-Fi settings page on a device screen before a device 202 (e.g., similar to device 102) is successfully paired with a network receiver (e.g., network receiver 104). Generally, a Wi-Fi scanning operation on the device 202 is manifested on a Wi-Fi settings page 201 by a "Choose a Network" ON/OFF button 206. When the ON/OFF button 206 is switched to the ON position, the Wi-Fi scanning operation of the device 202 may persistently run automatically. As a result, a significant loss of battery life in the device 202 may occur. Before a device 202 is successfully paired with a network receiver (such as the network receiver 104), the ON/OFF button 206 may be switched to the ON position, indicating that the device 202 may be scanning for nearby Wi-Fi networks. In some aspects, an indication that the device 202 is scanning for Wi-Fi networks can be evidenced by the population of the available networks pane 222, where nearby Wi-Fi networks are listed. For example, as illustrated in FIG. 2A, the networks Tom's Home 208, BananaStand 218, and Mike's Home 220 are all listed as nearby Wi-Fi networks in the available networks pane 222.

In some example aspects, a user may consider which nearby networks listed in available networks pane 222 would be conducive to establishing a BTLE-enabled pairing with device 202. As illustrated in FIG. 2A, among the three networks listed in available networks pane 222, Tom's Home network 208 is the only network that includes a small Bluetooth symbol 216. The Bluetooth symbol 216 may indicate that Tom's Home network 208 is BTLE-enabled. In other example aspects, Bluetooth Low Energy capabilities may be indicated in other ways and symbols. In addition to the Bluetooth symbol 216, Tom's Home network 208 also includes a lock symbol 214, which may indicate that Tom's Home network 208 is a private network that requires a unique passkey to establish a successful connection. The Wi-Fi symbol 212 may indicate the strength of Tom's Home network 208, and the information icon 210 may display further information about the Tom's Home network 208 upon selection.

As illustrated in FIG. 2A, device 202 may consume significant amounts of battery power. The significant consumption of battery power may be reduced when a user manually turns OFF a Choose a Network ON/OFF button 206. However, turning OFF the Choose a Network operation (which may turn off the Wi-Fi scanning operation) may prevent device 202 from establishing a successful Wi-Fi connection with a network receiver broadcasting a certain network, such as Tom's Home network 208. However, a user may still be able to establish a connection between the device and the network receiver through other means, such as infrared wireless, ultra wideband, and induction wireless.

In accordance with the previously described systems 100 and 101, a user may select Tom's Home network 208 from the listed networks in available networks pane 222. Upon selecting Tom's Home network 208, the device 202 may exchange data with the network receiver (see FIGS. 1A and 1B). During this data exchange between the device 202 and the network receiver, a determination may be made as to whether the device 202 and the network receiver are BTLE-enabled. If the device 202 and the network receiver are BTLE-enabled, then the device 202 and the network receiver may initiate a Bluetooth pairing step.

FIG. 2B illustrates an example of a Bluetooth settings page on a device screen receiving a Bluetooth pairing request message from a network receiver. The Bluetooth settings page 230 indicates the Bluetooth settings on the device 202. In one example, the network being broadcasted may be "Tom's Home." In one example, during the previously described systems 100 and 101, after the user selects "Tom's Home" from the listed Wi-Fi networks in available networks pane 222 (as described in FIG. 2A), the device 202 and the network receiver may exchange data to determine whether the device 202 and the network receiver are BTLE compatible. If the system determines that the device 202 and the network receiver are BTLE compatible, then the network receiver may transmit a Bluetooth (BT) pairing request 232 to the device 202. In another example, a BTLE-enabled network receiver may automatically transmit a BT pairing request 232 to any detected device 202, whether or not information was previously exchanged. The BT pairing request 232 may read as follows within an interface of the device 202: "'Tom's Home' would like to pair with your device." The BT pairing request 232 may include an option to select the cancel button 234 to reject the BT pairing request 232 or select the pair button 236 to accept the BT pairing request 232 from the network receiver.

FIG. 2C illustrates an example of a Bluetooth (BT) settings page 230 on a device screen after a BT pairing request 232 (see FIG. 2B) from a network receiver has been accepted. Once the user accepts the BT pairing request 232 by selecting the pair button 236, then the device 202 may pair with the network receiver according to the Bluetooth pairing protocol. Additionally, the device 202 may display a section under the BT settings page 230, labeled as "My BT Networks" 238. In aspects, successfully paired BTLE-enabled devices may be displayed in My BT Networks 238. For example, if the user successfully paired with the network receiver that was broadcasting a network identified as "Tom's Home," then Tom's Home network 208 may appear under My BT Networks 238. Some devices may present various indications of a successful connection with the network receiver. For example, some devices may indicate a successful connection by changing the text identifying Tom's Home network 208 to a particular font color, e.g., the color blue. Other examples may place a checkmark icon 242 adjacent to Tom's Home network 208 to indicate a successful connection.

In other examples, a user may have the option to remove any BTLE-enabled network receivers under My BT Networks 238. For instance, the user may have the option of removing (e.g., "forgetting") Tom's Home network 208 (which may be similar to network receiver 104). During the removal process between a device and a network receiver, among other information, the data 112 may be deleted from the device and/or the network receiver. For instance, previously paired network receivers may be deleted from a stored list on the device 202, if the user so desires. In other example aspects, automatic removal between a device and a network receiver may occur after a certain passage of time. For example, if the device does not pair with Tom's Home network 208 after six months, then the system may automatically delete Tom's Home network 208 and any data 112 associated with Tom's Home network 208.

In other examples, a user may desire to indefinitely disable Bluetooth capabilities of device 202. For instance, a user may manually switch the Bluetooth ON/OFF button 244 to the OFF position (not shown) and disable BLTE services on device 202. Similarly, a user may desire to indefinitely disable a network receiver's Bluetooth capabilities. In some aspects, if a network receiver's BTLE capabilities are turned OFF, then the network receiver may only be able to broadcast signals via Wi-Fi. In other example aspects, a device with both BTLE and Wi-Fi capabilities disabled may still be able to connect with a network receiver through other means, such as infrared wireless, ultra wideband, and induction wireless.

FIG. 2D illustrates an example of a Wi-Fi settings page 246 on a device screen after the BT pairing request 232 from the network receiver has been accepted. In some example aspects, once a user successfully pairs with and/or subsequently detects a BTLE-enabled network receiver using Bluetooth protocol, the network that is associated with the BTLE-enabled network receiver may then automatically establish a Wi-Fi connection with the device 202. In other example aspects, if a network receiver requires a separate passkey to access the Wi-Fi network associated with the network, then a user may be required to manually enter the passkey to establish a successful connection with the Wi-Fi network. In some example aspects, the passkey may be an alphanumeric input string, a voice command, a fingerprint verification, a facial recognition verification, and other biometric identification methods.

As illustrated in FIG. 2D, device 202 has successfully connected to Tom's Home network 208 via a Wi-Fi signal, as illustrated by the identification of Tom's Home network 208 in the connected networks pane 224. In some embodiments, a successful connection may be indicated by a checkmark 226 that is located adjacent to the current connection name in the connected networks pane 224. In some cases, as described above, when device 202 has successfully paired with a network receiver via a BTLE signal, a Wi-Fi scanning operation may be automatically disabled, e.g., the Choose a Network ON/OFF button 206 may automatically be switched OFF. In this case, a subsequent Wi-Fi connection between the device 202 and the network device may be automatically triggered when the device 202 detects the network device via a BTLE signal. This automatic termination of the Choose a Network operation may disable the persistent Wi-Fi scanning function that consumes large amounts of battery power from device 202. Thus, by automatically turning off the Wi-Fi scanning function by turning the Choose a Network ON/OFF button 206 to the OFF position, the battery power of device 202 may be considerably prolonged.

As should be appreciated, the various methods, devices, components, etc., described with respect to FIGS. 2A, 2B, 2C, and 2D are not intended to limit the systems and methods being performed by the particular components described. Accordingly, additional topology configurations may be used to practice the methods and systems herein and/or components described may be excluded without departing from the methods and systems disclosed herein.

Figure 3:
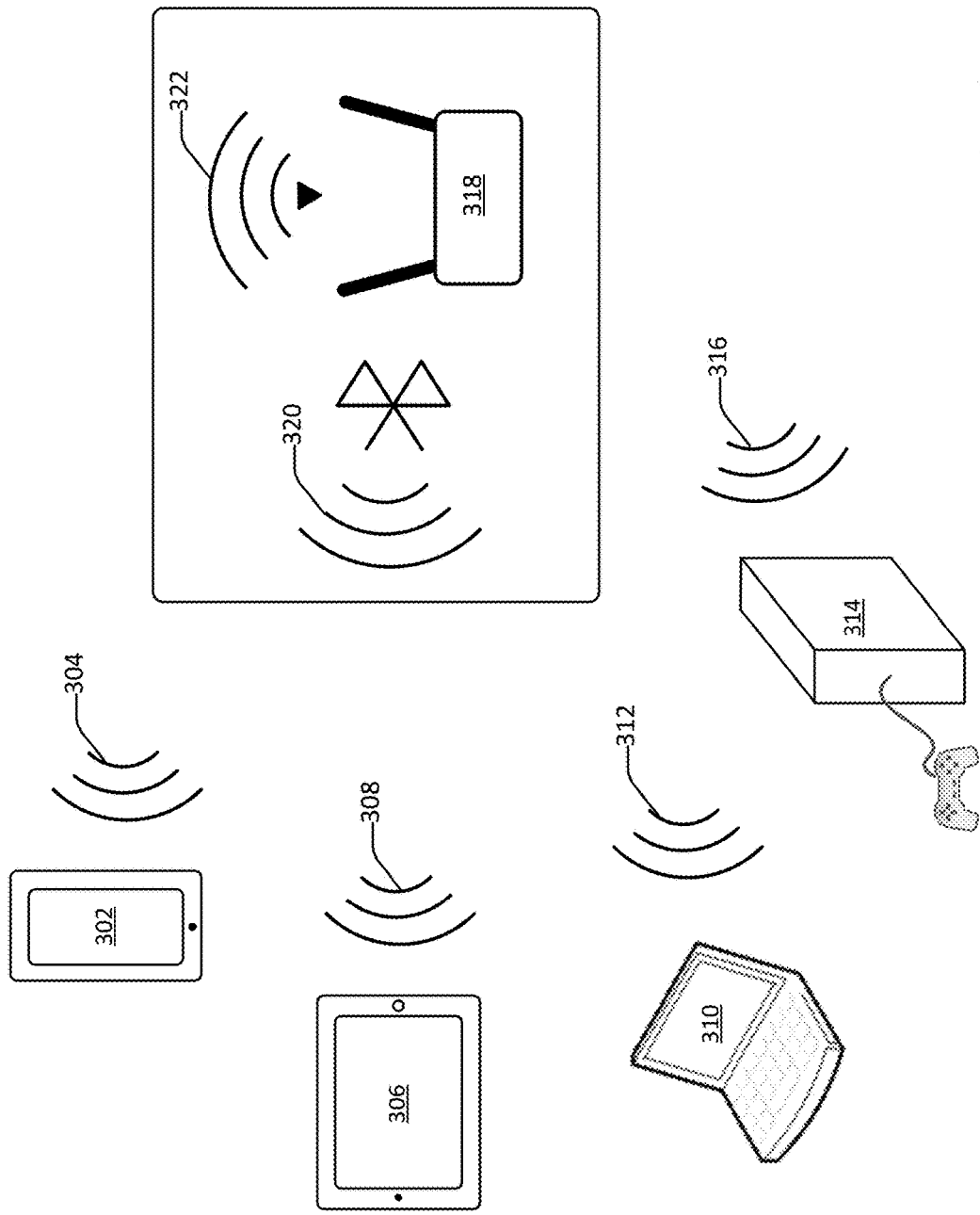
FIG. 3 illustrates an example of various devices listening for Bluetooth Low Energy signals and a network receiver transmitting a Bluetooth Low Energy signal.

FIG. 3 illustrates an example of various devices listening for Bluetooth Low Energy signals and a network receiver transmitting a Bluetooth Low Energy signal. A BTLE-enabled network receiver 318 may be simultaneously connected to the maximum allowable number of electronic devices per Bluetooth protocol (currently that number is 8). A network receiver 318 may broadcast a Wi-Fi signal 322 simultaneously with a Bluetooth signal 320. As illustrated in FIG. 3, a mobile device 302 may receive a Bluetooth signal 304 from network receiver 318. At the same time, tablet 306 may receive a Bluetooth signal 308 from network receiver 318, laptop 310 may receive a Bluetooth signal 312 from network receiver 318, and a gaming console 314 may receive a Bluetooth signal 316 from network receiver 318.

Bluetooth technology leverages a technique called "spread-spectrum frequency hopping" to minimize the incidence of more than one device transmitting on the same frequency at the same time. In this technique, a device (such as mobile device 302) may use 79 individual, randomly chosen frequencies within a designated range, changing from one to another on a regular basis. In the case of Bluetooth, the transmitters change frequencies 1,600 times every second, allowing more devices to make full use of a limited slice of the radio spectrum. In short, as more BTLE-enabled devices are successfully paired with network receiver 318, any interference among the devices 302, 306, 310, and 314 may only last a small fraction of a second.

As should be appreciated, the various methods, devices, components, etc., described with respect to FIG. 3 are not intended to limit the systems and methods being performed by the particular components described. Accordingly, additional topology configurations may be used to practice the methods and systems herein and/or components described may be excluded without departing from the methods and systems disclosed herein.

Figure 4:
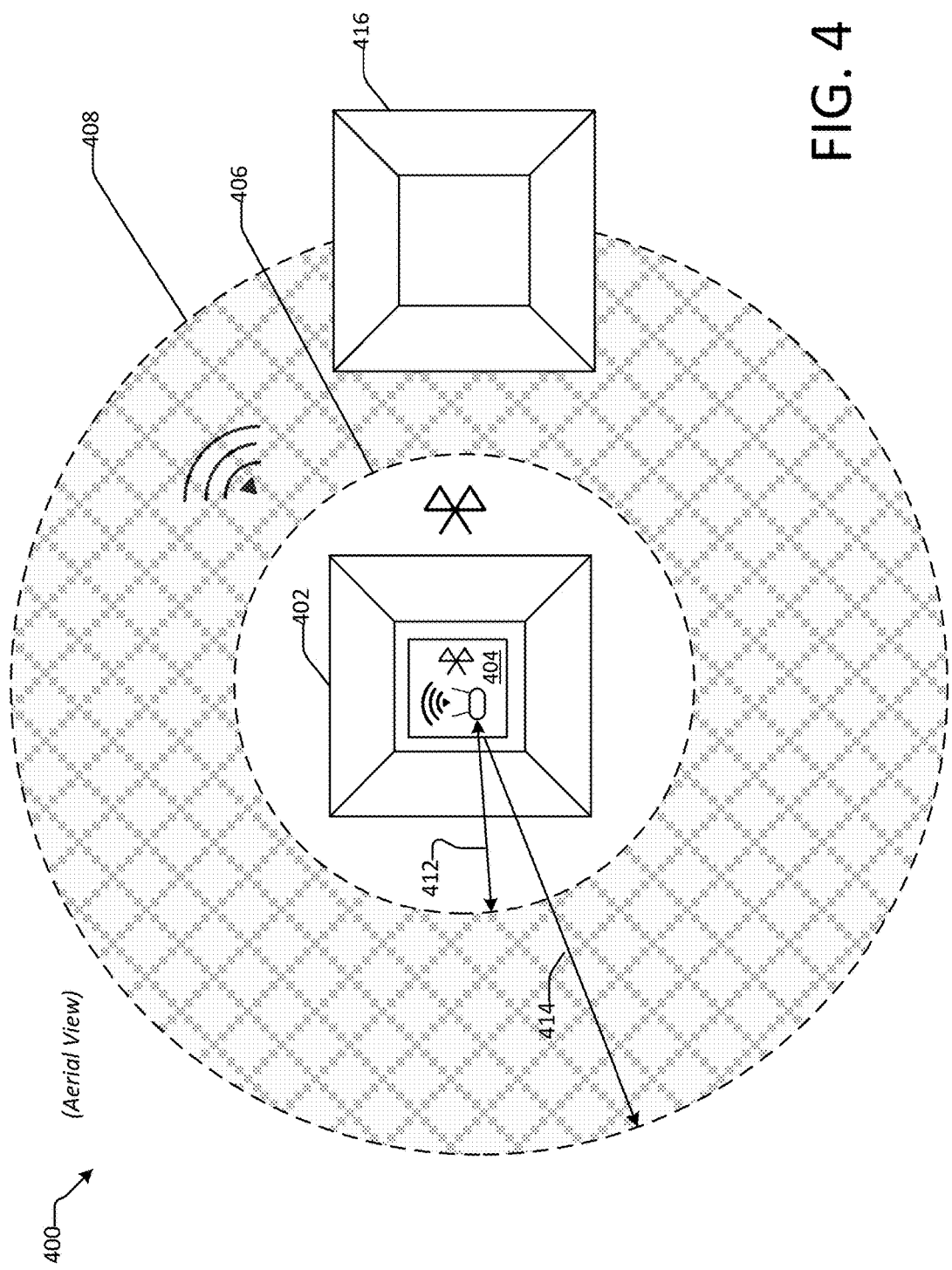
FIG. 4 illustrates an example of geographic ranges of a Bluetooth Low Energy signal and a Wi-Fi signal emanating from a shared network receiver.

FIG. 4 illustrates an example of geographic ranges of a Bluetooth Low Energy signal and a Wi-Fi signal emanating from a shared network receiver. Example 400 contains a BTLE-enabled network receiver 404, located inside a house 402. The inner dashed ring represents the BTLE signal range 406 (not to scale) of the network receiver 404. The outer dashed ring represents the Wi-Fi signal range 408 (not to scale). As illustrated, the Wi-Fi signal range measurement 414 is approximately between 32 and 95 meters (not to scale), whereas the Bluetooth signal range measurement 412 is approximately 10 meters or 32 feet (not to scale). Due to the higher frequencies, stronger signals, and high bandwidth, Wi-Fi signals have a significantly larger range than BTLE signals. However, in some example aspects, users may discover that that extended range of a Wi-Fi signal is unnecessary and even problematic. For instance, consider neighboring home 416. Part of neighboring home 416 is within the Wi-Fi signal range 408. Thus, a user residing in neighboring home 416 may attempt to connect to the network receiver 404 via Wi-Fi without authorization.

In one aspect, a user may have the option to manually limit the public connection signals emanating from the network receiver 404. Per IEEE 802.11 standard, every wireless network possesses an identifier that can be used by devices to connect to that network. This is called the Service Set Identifier (SSID). Although network receivers broadcast a beacon frame, which includes information about the network, a user may have an option to configure the network receiver so that it possesses a limited wireless access point. This may be accomplished by requiring the proximity of a near field communication, a BTLE signal, or a button press on one or more of the devices before a device and a network receiver may connect. In another aspect, the network receiver may be configured to turn off its Wi-Fi advertisement/presence and turn on its BTLE advertisement to save power. Then, when a device is within the BTLE signal range of the network device, a connection over BTLE can be established, the network receiver may turn ON its Wi-Fi signal and the device may then connected via Wi-Fi.

As illustrated in FIG. 4, a user may configure the network receiver 404 to require a device to be within the BTLE signal range 406 for a Wi-Fi connection to be established. For instance, although a device may be located within the Wi-Fi signal range 408, the device may not successfully establish a Wi-Fi connection with network receiver 404 until that device is located within the BTLE signal range 406. In one aspect, a user may also configure the strength of the BTLE signal emanating from the network receiver 404. For instance, a user may desire to place the network receiver 404 in a home office. The user may then limit the BTLE signal range 406 to a 4-meter radius. Doing so would require a device to be inside the home office (which is within the 4-meter radius of the restricted BTLE signal range) to establish an automatic connection between the device and the network receiver 404. A person having ordinary skill in the art may be able to leverage signal attenuation properties or power control to limit the BTLE signal range 406.

For example, a user may have the option of adjusting the transmission power of the BTLE signal originating from the network receiver 404. A user may desire to limit the BTLE signal range 406 to less than 10 meters, so the user may reduce the transmission power from 2.5 megawatts to 1 megawatt. In this way, the power usage of the network receiver may be reduced. Additionally or alternatively, a user may configure the BTLE signal range of an electronic device such that the electronic device may not successfully establish a BTLE connection outside of the set range. Similarly, by reducing the BTLE signal range, the power usage of the electronic device may be reduced. Alternatively, if the user desires to increase the BTLE signal range 406, the user may increase the transmission power. Such control over the range of the BTLE signal range 406 and the Wi-Fi signal range 408 may be desirable in other example aspects. For instance, in a crowded apartment complex, a user may want to limit the BTLE signal range 406 of the network receiver 404 so that the BTLE signal range 406 is within the confines of the user's apartment.

Furthermore, as described previously, once a user has successfully established a BTLE pairing between a BTLE-enabled electronic device and a BTLE-enabled network receiver, the system may automatically terminate the Wi-Fi scanning operation on the electronic device. In the context of a crowded apartment complex, a user may conserve significant battery life when entering and exiting the perimeter of the apartment complex because the device will not be persistently scanning and attempting to connect to a plethora of various Wi-Fi networks radiating from other network receivers in the complex. However, once a user's device is within the BTLE signal range 406, it may automatically detect the network receiver 404 via the BTLE signal and automatically establish a Wi-Fi connection with the network receiver 404.

In aspects, once a Wi-Fi connection has been established within the BTLE signal range 406, the device may remain connected to the network receiver 404 via the Wi-Fi connection as long as the device remains within a geographic range of the Wi-Fi signal. That is, the Wi-Fi connection may be maintained when the device exits the BTLE signal range 406. In a further aspect, an electronic device that remains connected to the network receiver 404 via a Wi-Fi connection when outside of the BTLE signal range 406 may not attempt to "re-establish" the Wi-Fi connection when the device re-enters the BTLE signal range 406. That is, as the geographic range of the BTLE signal is generally more limited, an electronic device may exit the BTLE signal range 406 without exiting the Wi-Fi signal range 408. In some cases, if the electronic device reenters the BTLE signal range 406 while the device is connected to the network receiver via a Wi-Fi connection, the electronic device and the network receiver 404 may forgo a subsequent BTLE pairing process and subsequent attempt to establish a Wi-Fi connection since the electronic device is already connected via Wi-Fi to the network receiver 404.

In another aspect, once an electronic device has successfully detected the network receiver 404 using BTLE signals and has successfully established a Wi-Fi connection between the electronic device and the network receiver 404, a user may desire to limit the activity of the Bluetooth capabilities of the electronic device in order to further conserve battery power of the device. The regular Bluetooth connection mode between an electronic device and a network receiver is known as "active mode." In some embodiments, a user may want to place the electronic device into "sniff mode," which is a power-saving mode whereby the device listens for Bluetooth transmissions at a set interval (e.g., every 100 milliseconds). In further embodiments, a user may have the option of adjusting this set interval to further conserve battery power (e.g., every 1 second). In other embodiments, a user may desire to place the electronic device into "hold mode," which is a temporary power-saving mode whereby a device sleeps for a defined period and then returns back to active mode when that interval has passed. In another embodiment, a user may desire to place the electronic device into "park mode," which is the deepest of sleep modes. While in "park mode," the electronic device is not listening for Bluetooth signal transmissions and is conserving significant amounts of battery power.

As should be appreciated, the various methods, devices, components, etc., described with respect to FIG. 4 are not intended to limit the systems and methods being performed by the particular components described. Accordingly, additional topology configurations may be used to practice the methods and systems herein and/or components described may be excluded without departing from the methods and systems disclosed herein.

FIG. 5A illustrates an example of a device located within a network receiver's Bluetooth Low Energy signal range. For example, network receiver 504 is located within a work location 502. As illustrated, device 512 is located within a BTLE signal range 506 of the network receiver 504, and the device 512 is listening for BTLE signals. In one example aspect, device 512 may have previously been successfully paired with another network receiver, such as a home network receiver (not shown). Even though the device 512 may have paired successfully with at least one other BTLE-enabled network receiver, the device 512 may also pair successfully with the BTLE-enabled network receiver 504 at work location 502. If the device 512 had not been previously paired with network receiver 504, the user may initially connect the device 512 and the network receiver 504. In some aspects, the initial connection may be a manual connection, involving user interaction with the device 512.

FIG. 5B illustrates an example of a Wi-Fi settings page 548 on a device screen after the device has been paired with a first network receiver and before the device is paired to a second network receiver. Currently, in one example aspect, since the electronic device was previously successfully paired with another network receiver, the Choose a Network ON/OFF button 522 located in the Choose a Network bar 520 may have been automatically turned OFF (see FIG. 2D). As previously described, this automatic turning OFF of the Choose a Network ON/OFF button 522 may disable the persistent Wi-Fi scanning operation on device 512. As such, no networks are identified in available networks pane 524. Disabling the persistent Wi-Fi scanning operation on device 512 may conserve significant amounts of battery power that otherwise would be wasted if the Wi-Fi scanning operation remained active.

FIG. 5C illustrates an example of a Wi-Fi settings page 548 on a device screen after the "Choose a Network" option is turned ON. Optionally, in some aspects, if device 512 had been previously successfully paired with another network receiver and not yet successfully paired with network receiver 504 (see FIG. 5A), in order for the device 512 to successfully pair with network receiver 504, the Choose a Network ON/OFF button 522 may be switched to the ON position. By switching the Choose a Network ON/OFF button 522 to ON, the Wi-Fi scanning operation of device 512 may initiate. The Wi-Fi scanning operation allows the device 512 to receive Wi-Fi signals emanating from nearby network receivers, such as network receiver 504. As illustrated, once the Choose a Network ON/OFF button 522 is switched ON, the available networks pane 524 may be populated with a nearby network, e.g., Tom's Work network 544. Tom's Work network 544 may be BTLE-enabled as indicated by the Bluetooth symbol 526 in the available networks pane 524. The Wi-Fi symbol 528 may indicate the signal strength of Tom's Work network 544. A user may then elect to connect to Tom's Work network 544 via Wi-Fi.

FIG. 5D illustrates an example of a Bluetooth settings page 530 on a device screen receiving a Bluetooth pairing request message from a second network receiver. If Tom's Work network 544, which is emanating from network receiver 504, is BTLE-enabled, then a Bluetooth pairing request 536 may display on the device screen of the device 512 under the Bluetooth settings page 530. Once a user receives the Bluetooth pairing request 536, the user may elect to pair with the network device 504 by selecting the pair button 538 or may reject the pairing request by selecting the cancel button 540. In some example aspects, network receiver 504 may send pairing request 536 whether or not the Wi-Fi scanning operation was switched to ON (see FIG. 3C), and whether or not the device 512 has established a Wi-Fi connection with network receiver 504 (see FIG. 5C).

FIG. 5E illustrates an example of a Bluetooth settings page 530 on a device screen after a Bluetooth pairing request from a second network receiver has been accepted. If the user elected to pair the device 512 with network receiver 504, the Bluetooth pairing request 536 may disappear from the device screen on device 512, and underneath the My BT Networks pane 542, a list of successfully paired BTLE-enabled network receivers may appear. As illustrated, a user may have previously established a successful BTLE pairing with Tom's Home network 546. Additionally, the user may subsequently establish a successful BTLE pairing between device 512 and Tom's Work network 544.

In other example aspects, a user's device 512 may store several previously paired BTLE-enabled network receivers. A user may have the option to manually remove the previously paired BTLE-enabled network receivers. Alternatively, the system may automatically remove a BTLE-enabled network receiver due to inactivity. For example, if the system detected that device 512 had not been connected to Tom's Work network 544 for more than 3 months, then the system may automatically remove Tom's Work network 544 from the My BT Networks pane 542 of the Bluetooth settings page 530 on device 512.

As should be appreciated, the various methods, devices, components, etc., described with respect to FIGS. 5A, 5B, 5C, 5D, and 5E are not intended to limit the systems and methods being performed by the particular components described. Accordingly, additionally topology configurations may be used to practice the methods and systems herein and/or components described may be excluded without departing from the methods and systems disclosed herein.

Figure 6:
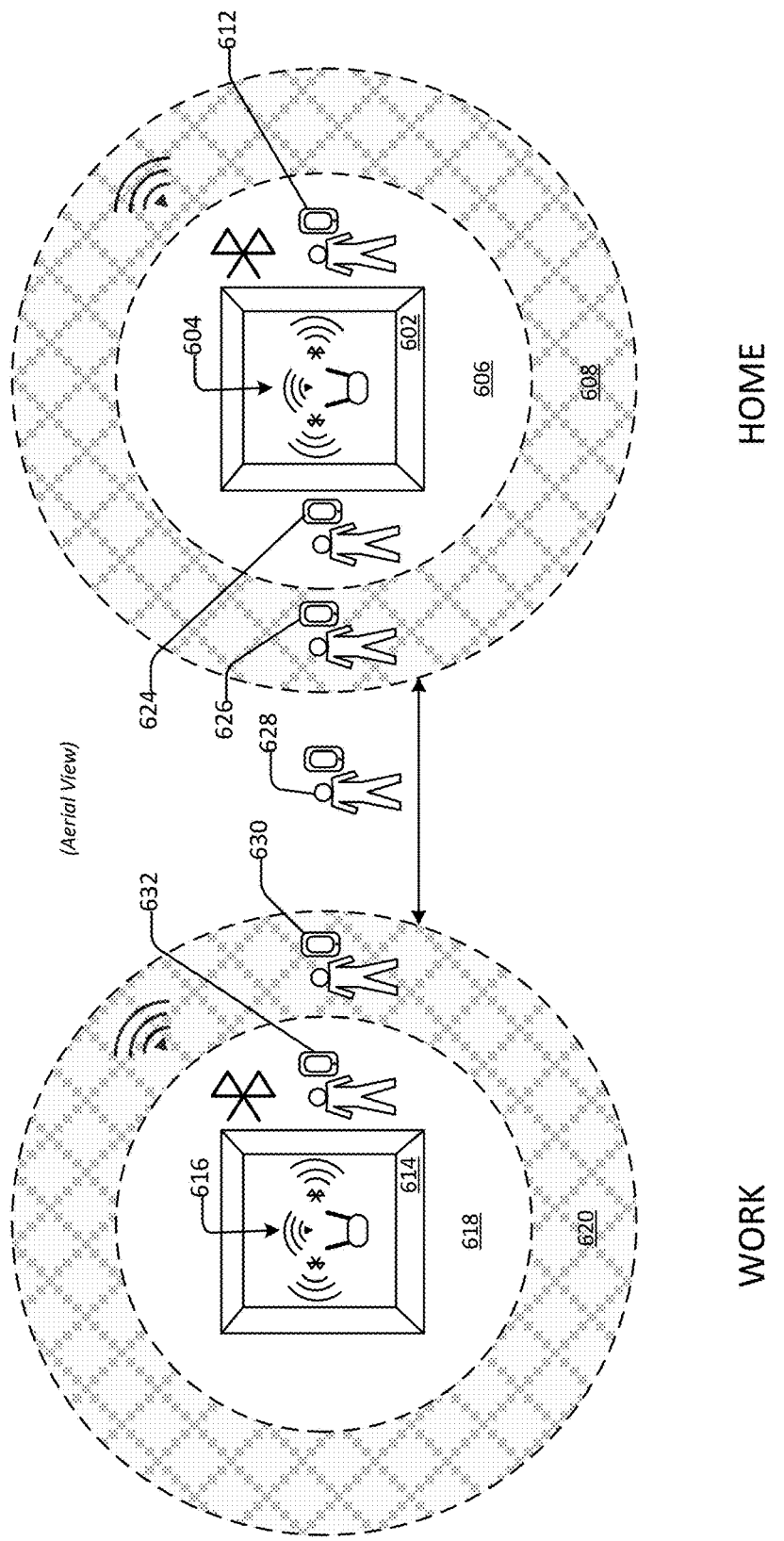
FIG. 6 illustrates an example of various geographic locations of an electronic device in relation to first and second network receivers, each emanating a Bluetooth Low Energy signal and a Wi-Fi signal.

FIG. 6 illustrates an example of various geographic locations of a device in relation to first and second network receivers, each emanating a Bluetooth Low Energy signal and a Wi-Fi signal. As illustrated, a home network receiver 604 may be located in a home location 602, while a work network receiver 616 may be located in a work location 614. The BTLE signal range 606 (not to scale) and the Wi-Fi signal range 608 (not to scale) correspond to the home network receiver 604, while the BTLE signal range 618 (not to scale) and the Wi-Fi signal range 620 (not to scale) correspond to the work network receiver 616.

In one example aspect, a device may be located in position 624, which is within the BTLE signal range 606 of the home network receiver 604. If the device has already established a successful BTLE pairing with network receiver 604, then the device may automatically connect to the network receiver 604 at position 624 without utilizing a Wi-Fi scanning operation. In another example, a user may leave the home location 602 to position 626, which is outside of the BTLE signal range 606 but within the Wi-Fi signal range 608 of the network receiver 604. In some aspects, once the device has established a Wi-Fi connection with network receiver 604, the device may remain connected to network receiver 604 within the Wi-Fi signal range 608. In other aspects, the device may be configured to automatically disconnect from network receiver 604 when the device exceeds a Wi-Fi range (not shown) configured on the device, as described above. In this way, the device may not remain unnecessarily connected to the network receiver 604 when the device exceeds the pre-configured range (not shown) (e.g., while the user is driving away from home location 602). This persistent Wi-Fi connection between a device and the network receiver 604 may be undesirable to a user and cause a significant loss of battery power to the device. Alternatively still, if the device that is located in position 626 is BTLE-enabled and has been successfully paired to BTLE-enabled network receiver 604, then the Wi-Fi connection may be terminated at position 626 within Wi-Fi signal range 608. The termination of the Wi-Fi connection between the device and the network receiver 604 occurs when the device is outside of the BTLE signal range 606. At position 626, a device may conserve battery power when it was previously paired to the BTLE-enabled network receiver 604.

Similarly, with respect to work location 614, a device that is within the BTLE-enabled range 618 may detect the BTLE-enabled network receiver 616 via a BTLE signal and automatically connect to the network receiver 616 via a Wi-Fi signal without using a Wi-Fi scanning operation (e.g., when the device had previously been successfully paired with network receiver 616). Alternatively, when the device had not previously been paired with the network receiver 616, the device that is at position 630 within Wi-Fi signal range 620 may be connected to the network receiver 616 via Wi-Fi using a Wi-Fi scanning operation. However, in this case, the device may remain unnecessarily connected or continuously attempt to connect to the network receiver 616 via Wi-Fi. This persistent Wi-Fi scanning operation by the device may be undesirable to a user and cause a significant loss of battery power to the device. Conversely, if the device is BTLE-enabled and was previously paired successfully with network receiver 616, the device may be configured to automatically terminate the Wi-Fi connection at position 630 (e.g., when the user is driving away from work), thereby conserving a significant amount of battery life in the device.

In one example aspect as illustrated, a device that has been successfully paired via BTLE signals to both the home network receiver 604 and the work network receiver 616 may conserve a significant amount of battery power throughout the day and during the commute to and from the home location 602. If a device is routinely connected to particular networks during the day (e.g., home, work, favorite coffee shop, etc.), a user as illustrated in FIG. 6 may not need to turn ON the Wi-Fi scanning operation by turning ON the Choose a Network ON/OFF button 522 (see FIG. 5C). As a result, as the device travels from position 624 to position 626 to position 628 to position 630 to position 632 and back, the device may only search for and establish a Wi-Fi connection with the home network receiver 604 when the device is located within the BTLE signal range 606; and may only search for and establish a Wi-Fi connection with the work network receiver 616 when the device is within the BTLE signal range 618. In positions 626, 628, and 630, a BTLE-enabled device that does not have the Wi-Fi scanning operation turned ON conserves an immense amount of battery power, as opposed to devices that allow the Wi-Fi scanning operation to persist indefinitely and that continuously search for available network receivers using energy-hungry Wi-Fi scanning.

In another example aspect, a device that has been successfully paired via BTLE signals to both the home network receiver 604 and the work network receiver 616 may conserve a significant amount of battery power throughout the day and during the commute to and from the home location 602 by the Wi-Fi scanning function being disabled. Additionally, a user may visit a third location, such as a coffee shop at location 628. In location 628, a user may desire to establish a Wi-Fi connection with a network receiver at the coffee shop. In this case, the user may manually turn ON the Wi-Fi scanning operation of the device to identify an available network receiver in the coffee shop. Upon a successful connection with the network receiver via a Wi-Fi connection, the Wi-Fi scanning operation of the device may be maintained in an ON position unless and until the user manually turns OFF the Wi-Fi scanning operation. If the Wi-Fi scanning operation on the device remains active after departing the Wi-Fi signal range of the coffee shop network receiver, a user may travel from location 628 to location 632 and enter the BTLE signal range of the work network receiver 616. Upon entering the BTLE signal range of the work network receiver 616, the device may establish a Wi-Fi connection with the work network receiver 616 via Bluetooth, and the Wi-Fi scanning operation of the electronic device may automatically be terminated to further conserve the battery power of the electronic device.

As should be appreciated, the various methods, devices, components, etc., described with respect to FIG. 6 are not intended to limit the systems and methods being performed by the particular components described. Accordingly, additionally topology configurations may be used to practice the methods and systems herein and/or components described may be excluded without departing from the methods and systems disclosed herein.

Figure 7:
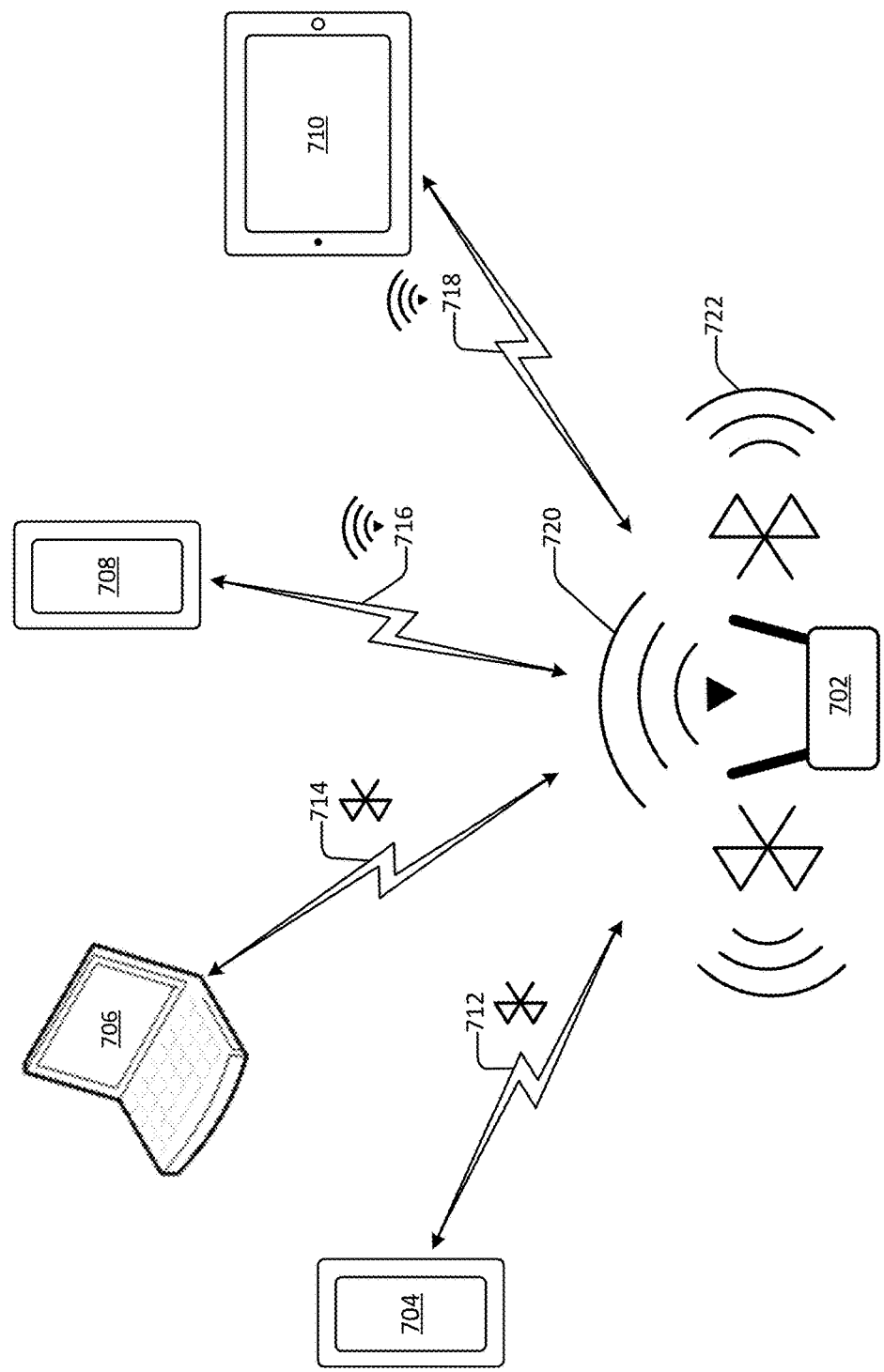
FIG. 7 illustrates a method for connecting multiple devices to a single network receiver via Bluetooth Low Energy signal, Wi-Fi signal, or a combination of both.

FIG. 7 illustrates a method for connecting multiple devices to a single network receiver via Bluetooth Low Energy signal, Wi-Fi signal, or a combination of both. As described earlier, a BTLE-enabled network receiver 702 may allow several devices to simultaneously connect to the network receiver 702. In some example aspects, a device 704 may connect to the network receiver 702 via BTLE signal 712, while device 708 may connect to network receiver 702 via Wi-Fi signal 716. A laptop computer 706 may also connect to the network receiver via BTLE signal 714, and a tablet 710 may connect to the network receiver 702 via Wi-Fi signal 718. As illustrative of a standard BTLE-enabled network receiver, network receiver 702 may emit both a BTLE signal 722 and a Wi-Fi signal 720. Thus, various devices may establish a connection with network receiver 702 either via BTLE signal or Wi-Fi signal. In further example aspects, more than four devices may be connected to network receiver 702.

Figure 8:
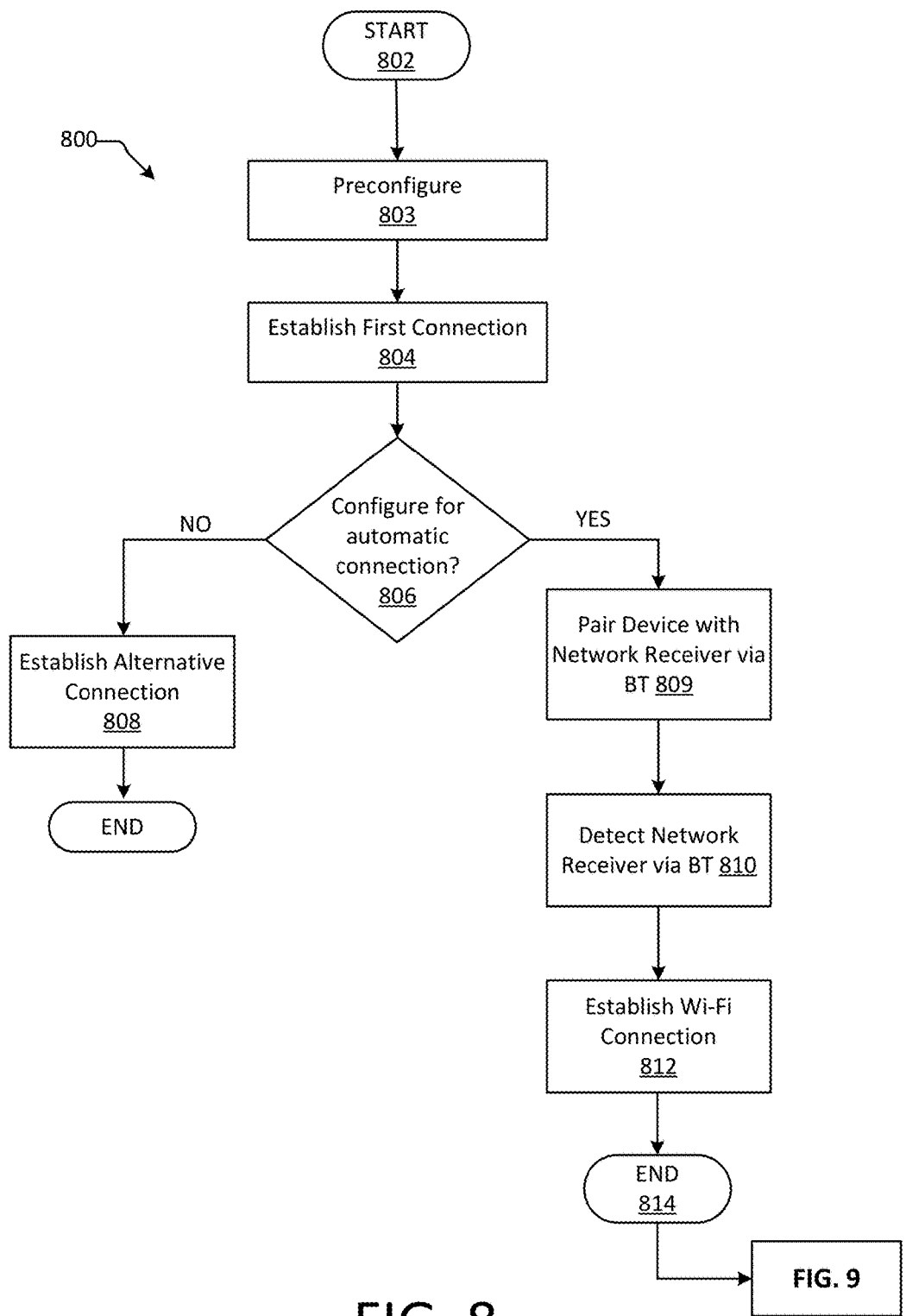
FIG. 8 is a flow chart illustrating a method for initially establishing a connection between an electronic device and a network receiver to prepare the device and the network receiver for subsequent automatic connections by means of a Wi-Fi signal.

FIG. 8 is a flow chart illustrating a method for initially establishing a pairing between a device and a network receiver to prepare the device and the network receiver for subsequent automatic connections by means of a Wi-Fi signal. Method 800 begins at starting point 802. Starting point 802 may involve a user selection of a nearby Wi-Fi network to connect to. Upon selecting a network broadcast from a network receiver, the device and the network receiver may enter a preconfiguring operation 803 to ensure that both the device and the network receiver are BTLE compatible. Furthermore, in the event that a network receiver is BTLE compatible, the BTLE signal of the network receiver may be preconfigured with a geographic range (e.g., by a manufacturer) and/or may be associated with a geographic range during the preconfiguring operation 803. After the preconfigure operation 803, the device and the network receiver may establish a first connection operation 804. During this first connection operation 804, a device and network receiver may exchange data that may comport with the Bluetooth standard pairing protocol.

The method may then proceed to determine configuration operation 806. If the network receiver is BTLE enabled and the user wishes to subsequently automatically establish Wi-Fi connections with the network receiver without using a Wi-Fi scanning operation, then the method may proceed to execute the Bluetooth Device Pairing operation 809. Conversely, if the network receiver is not BTLE enabled and/or if the user does not wish to subsequently automatically establish Wi-Fi connections with the network receiver, then the method may proceed to establish an alternative connection operation 808, such as a standard Wi-Fi connection using a Wi-Fi scanning operation.

At pairing operation 809, if the network receiver is BTLE enabled, the device may be paired with the network receiver via a BTLE signal (e.g., by accepting a pair request from the network receiver on the device). In some aspects, e.g., when the user wishes to subsequently automatically establish a Wi-Fi connection with the network receiver, the pairing operation 809 may further involve disabling the Wi-Fi scanning operation of the device (e.g., automatically, by user consent and/or by user selection). The disabling of the Wi-Fi scanning operation of the device in pairing operation 809 may significantly conserve the battery life of the device. In addition to disabling the Wi-Fi scanning operation of the device in pairing operation 809, the device and the network receiver may initiate standard Bluetooth Device Pairing, where data may be exchanged. During Bluetooth Device Pairing, a link key may be shared between the device and the network receiver. A link key may be defined as a cryptographic unique identifier composed of alphanumeric characters. Only the device and the network receiver possess the shared link key, so that subsequent automatic detections between the device and the network receiver via BTLE signals may be facilitated.

At detect operation 810, following a successful pairing of the device and the network receiver, the device and/or the network receiver may automatically detect the presence of the other device within a BTLE range of the network receiver. In aspects, the device may detect the network receiver via a BTLE signal when the Wi-Fi scanning operation of the device is disabled.

At connection operation 812, a Wi-Fi connection may automatically be established between the device and the network receiver. In some aspects, the data exchanged between the device and the network receiver may be stored (e.g., saving the link key) for future automatic connections. In some cases, upon detection of the network receiver via a BTLE signal, a Wi-Fi connection between the device and the network receiver may be triggered without using a Wi-Fi scanning operation. Alternatively or additionally, upon detection of the network receiver via a BTLE signal, a BTLE connection may automatically be established between the device and the network receiver. In this case, the device and the network receiver may subsequently automatically establish a Wi-Fi connection and/or the device and the network receiver may continue to communicate via the BTLE connection.

Figure 9:
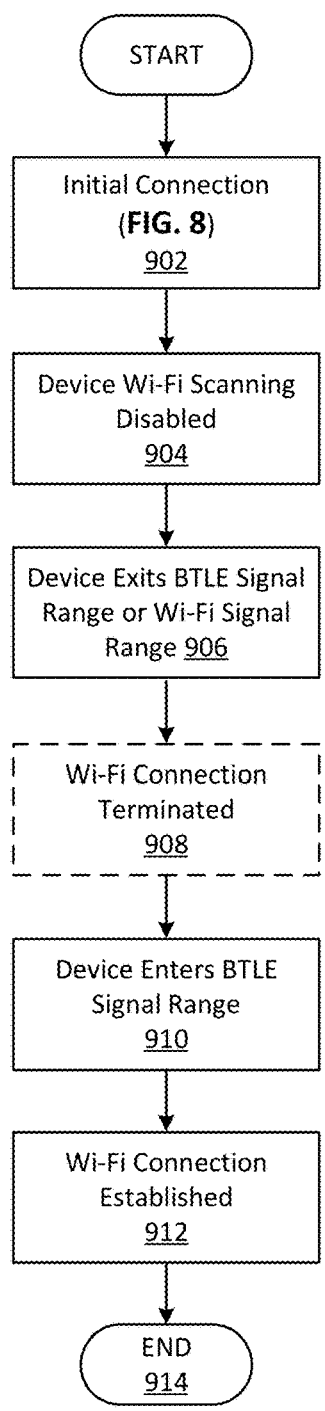
FIG. 9 is a flow chart illustrating a method for establishing an automatic connection between a device and a network receiver via a Wi-Fi signal.

The method may terminate at end operation 814 and continue to the method flow chart illustrated in FIG. 9. Subsequent connections between the device and the network receiver may be executed automatically due to the saved and shared information between the device and the network receiver that was exchanged during the initial pairing method 800. In some example aspects, first connection operation 804, which may include exchanging data and information between the device and the network receiver, may occur simultaneously with the determine configuration operation 806 and/or pairing operation 809, as the data and information being exchanged in first connection operation 804 may relate to BTLE capability information.

As should be appreciated, operations 802-814 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIG. 9 is a flow chart illustrating a method for establishing an automatic connection between a device and a network receiver via Wi-Fi signal without utilizing a Wi-Fi scanning operation. The method begins with an initial connection operation 902. As described above in FIGS. 1, 2 and 8, the initial connection operation 902 may include exchanging data and verification information between a device and a network receiver, determining if the network receiver and device are BTLE compatible, pairing the device and the network receiver if they are determined to be BTLE compatible, saving the data and verification information, and establishing a Wi-Fi connection between the device and the network receiver. Saving the data and verification information may include saving identification information related to the device and/or the network receiver. Such identification information may include a shared link key (e.g., unique alphanumeric identifier) that allows the device and the network receiver to establish subsequent automatic connections once the device is within the BTLE signal range of the network receiver.

After establishing an initial connection between an electronic device and a network receiver, if the Wi-Fi scanning operation is not disabled during pairing operation 809, the Wi-Fi scanning operation may be disabled at disable operation 904. Disabling the Wi-Fi scanning operation on the device may occur because the device is already successfully paired to a network receiver and has an established Wi-Fi connection. Thus, it may be undesirable to a user for a device to continue scanning for other Wi-Fi networks after the device is successfully paired to a network broadcasted from a paired network receiver. In aspects, a device's battery power will begin to be conserved immediately upon a successful Bluetooth pairing and a successful Wi-Fi connection (e.g., at connection operation 812) between the device and a network receiver. As discussed in previous examples, a user may have the option to manually turn ON the Wi-Fi scanning operation. For instance, a user may switch on the Choose a Network ON/OFF button 522 from FIG. 5C, which may initiate the persistent Wi-Fi scanning operation on the device.

At exit operation 906, the device may exit the BTLE signal range of the network receiver. In one aspect, once the device has exited the BTLE signal range, the Wi-Fi connection between the device and the network receiver may be terminated at optional termination operation 908. In this case, although the device may still remain within a Wi-Fi signal range of the network receiver, because the device was previously successfully paired with the BTLE-enabled network receiver, the device may only connect to the Wi-Fi signal when the device is within the BTLE signal range. In some aspects, this may be configured by using limited wireless access points. In this aspect, a wireless access point for a network receiver may be dependent on a BTLE connection, thereby automatically terminating the Wi-Fi connection between the device and the network receiver when the BTLE connection between the device and the network receiver is terminated. This aspect may be particularly useful within an apartment building or other location in which a user may wish to limit connection to the network receiver within a boundary of the user's apartment or other closely positioned location. Such feature may also be achieved by limiting the range of the Wi-Fi signal emitted by the network receiver and/or the device, as discussed above.

Alternatively, in another aspect, once the device has exited the BTLE signal range, the Wi-Fi connection between the device and the network receiver may not be terminated at optional termination operation 908. That is, although the device may exit the BTLE signal range, the device may remain connected to the Wi-Fi signal as long as the device remains within the Wi-Fi signal range. However, if the device exits the Wi-Fi signal range, the Wi-Fi connection between the device and the network receiver may be terminated at termination operation 908. In some cases, once the Wi-Fi connection has been terminated at termination operation 908, the device may be required to reenter the BTLE signal range (as opposed to reentering the Wi-Fi signal range) in order to reestablish a Wi-Fi connection with the network receiver. In other cases, e.g., if the exit from and reentry into the Wi-Fi signal range occur within a period of time, the Wi-Fi connection may automatically be reestablished once the device reenters the Wi-Fi signal range.

At enter operation 910, the device may enter the BTLE signal range of the network receiver. Once the device enters the BTLE signal range, a Wi-Fi connection between the device and the network receiver may automatically be triggered at establish operation 912.

Upon a successful automatic Wi-Fi connection at establish operation 912, the method may proceed to end operation 914. During subsequent connections with the network receiver, if a user previously established a successful BTLE pairing and Wi-Fi connection between the device and a network receiver, exits the BTLE signal range and/or the Wi-Fi signal range, and does not turn ON the Wi-Fi scanning operation on the device, then when the electronic device reenters the BTLE signal range of the network receiver, the Wi-Fi scanning operation may still be disabled, therefore eliminating the need to execute disable operation 904.

As should be appreciated, operations 902-914 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIGS. 10-13 and the associated descriptions provide a discussion of a variety of operating environments in which aspects of the disclosure may be practiced. However, the devices and systems illustrated and discussed with respect to FIGS. 10-13 are for purposes of example and illustration and are not limiting of a vast number of computing device configurations that may be utilized for practicing aspects of the disclosure, as described herein.

Figure 10:
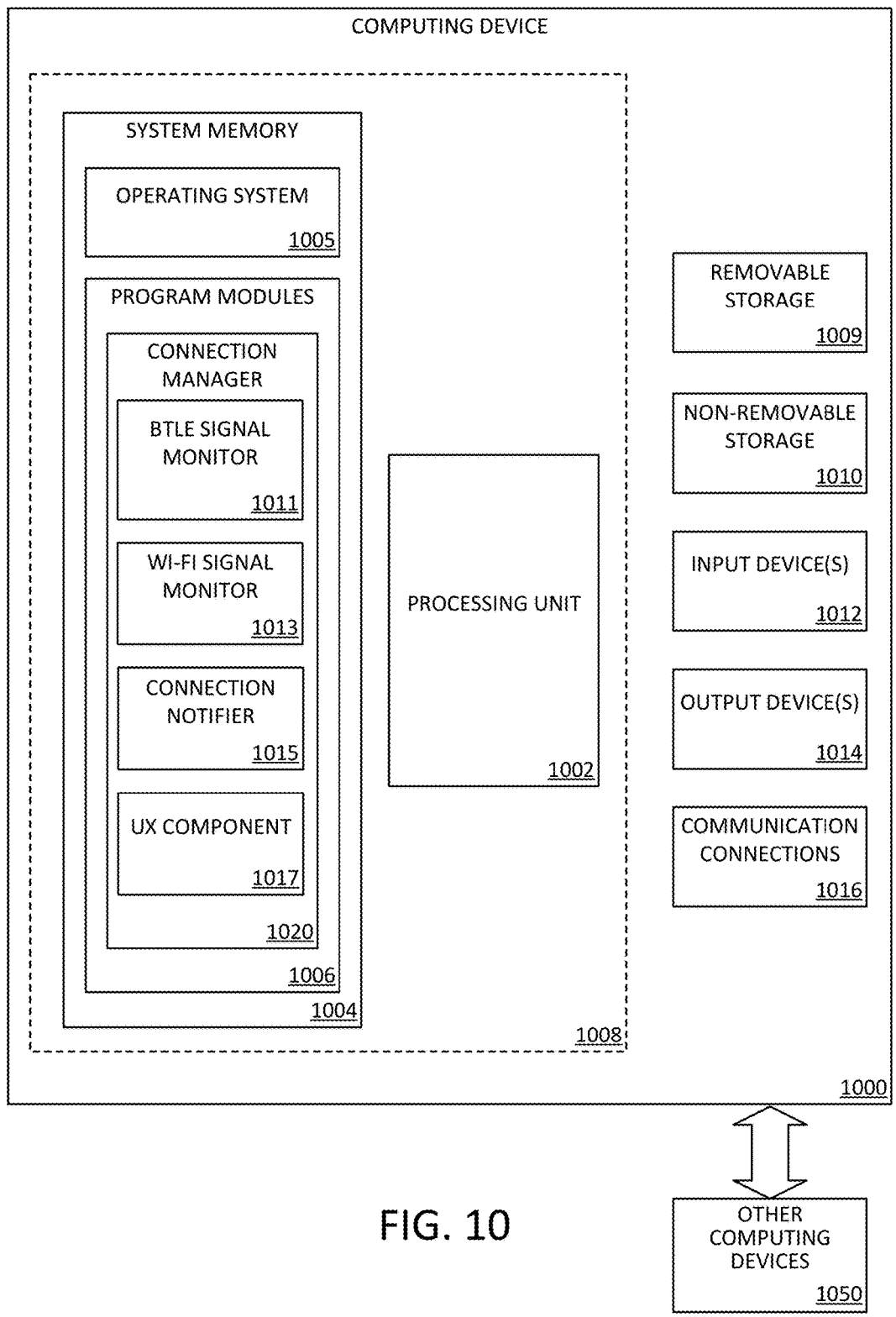
FIG. 10 is a block diagram illustrating example physical components of a computing device with which aspects of the disclosure may be practiced.

FIG. 10 is a block diagram illustrating physical components (e.g., hardware) of a computing device 1000 with which aspects of the disclosure may be practiced. The computing device components described below may have computer executable instructions for implementing a connection manager 1020 on a computing device (e.g., server computing device 108 and/or client computing device 104), including computer executable instructions for connection manager 1020 that can be executed to implement the methods disclosed herein, including a method of connecting a network receiver with one or more electronic devices using BTLE. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 and one or more program modules 1006 suitable for running connection manager 1020, such as one or more components with regard to FIG. 1 and, in particular, a BTLE Signal Monitor 1011, a Wi-Fi Signal Monitor 1013, a Connection Notifier 1015, and/or UX Component 1017.

The operating system 1005, for example, may be suitable for controlling the operation of the computing device 1000. Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., connection manager 1020) may perform processes including, but not limited to, the aspects, as described herein. Other program modules that may be used in accordance with aspects of the present disclosure, and in particular for connecting a network receiver with one or more electronic devices using BTLE, may include BTLE Signal Monitor 1011, Wi-Fi Signal Monitor 1013, Connection Notifier 1015, and/or UX Component 1017, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media may be non-transitory media that does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
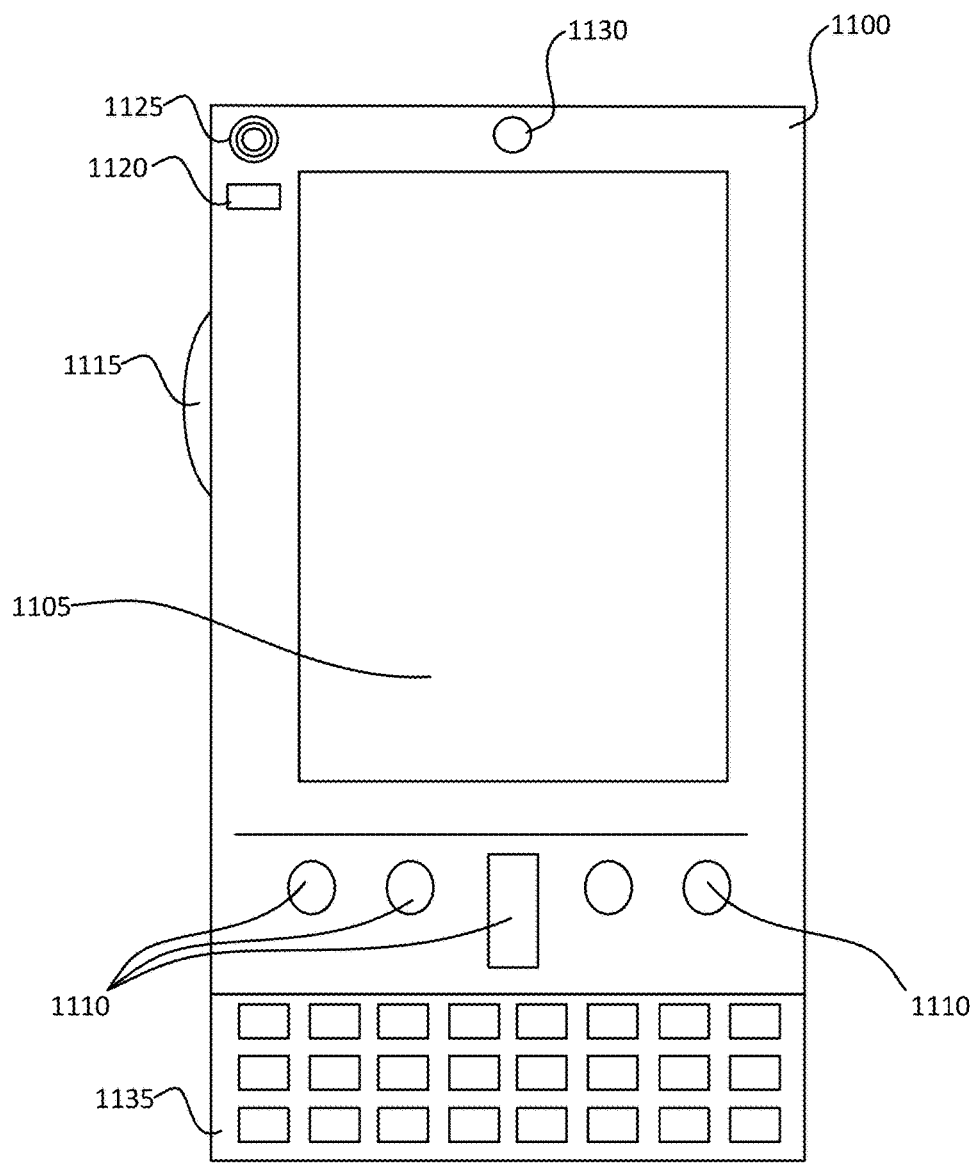
FIGS. 11A and 11B are simplified block diagrams of a mobile computing device with which aspects of the present disclosure may be practiced.
Figure 11B:
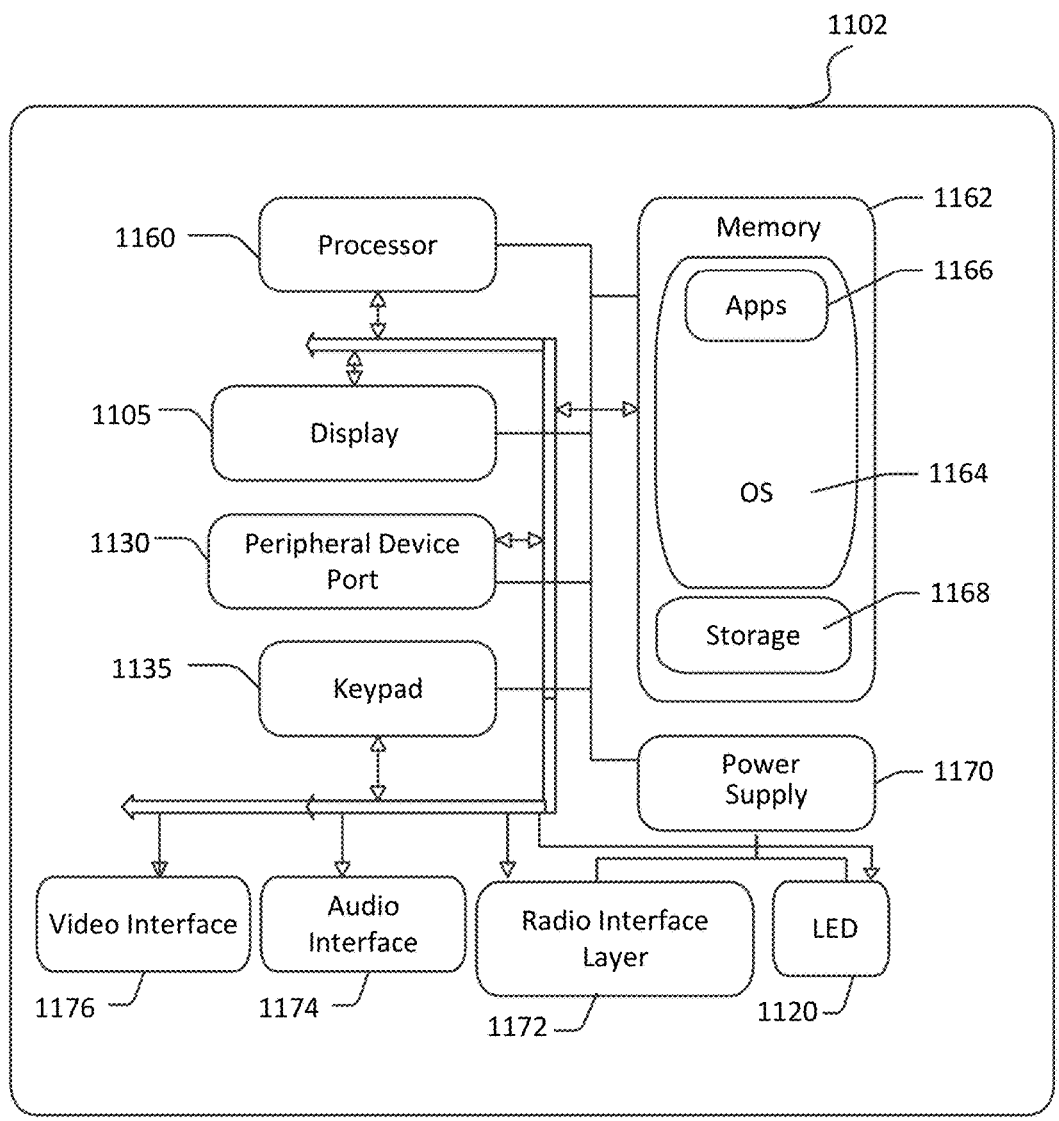

FIGS. 11A and 11B illustrate a mobile computing device 1100, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display). If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some embodiments. In yet another alternative embodiment, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various embodiments, the output elements include the display 1105 for showing a graphical user interface (GUI), a visual indicator 1120 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as email or other messages used by an email application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100, including the instructions for connecting a network receiver with one or more electronic devices using BTLE as described herein (e.g., connection manager, Bluetooth Signal Monitor, Wi-Fi Signal Monitor, connection notifier, and/or UX component, etc.).

The system 1102 has a power supply 1170, which may be implemented as one or more batteries. The power supply 1170 may further include an external power source, such as an AC adapter or a powered docking cradle that supplements or recharges the batteries. The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via an audio transducer 1125 (e.g., audio transducer 1125 illustrated in FIG. 11A). In the illustrated embodiment, the visual indicator 1120 is a light emitting diode (LED) and the audio transducer 1125 may be a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of peripheral device 1130 (e.g., on-board camera) to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

As should be appreciated, FIGS. 11A and 11B are described for purposes of illustrating the present methods and systems and are not intended to limit the disclosure to a particular sequence of steps or a particular combination of hardware or software components.

Figure 12:
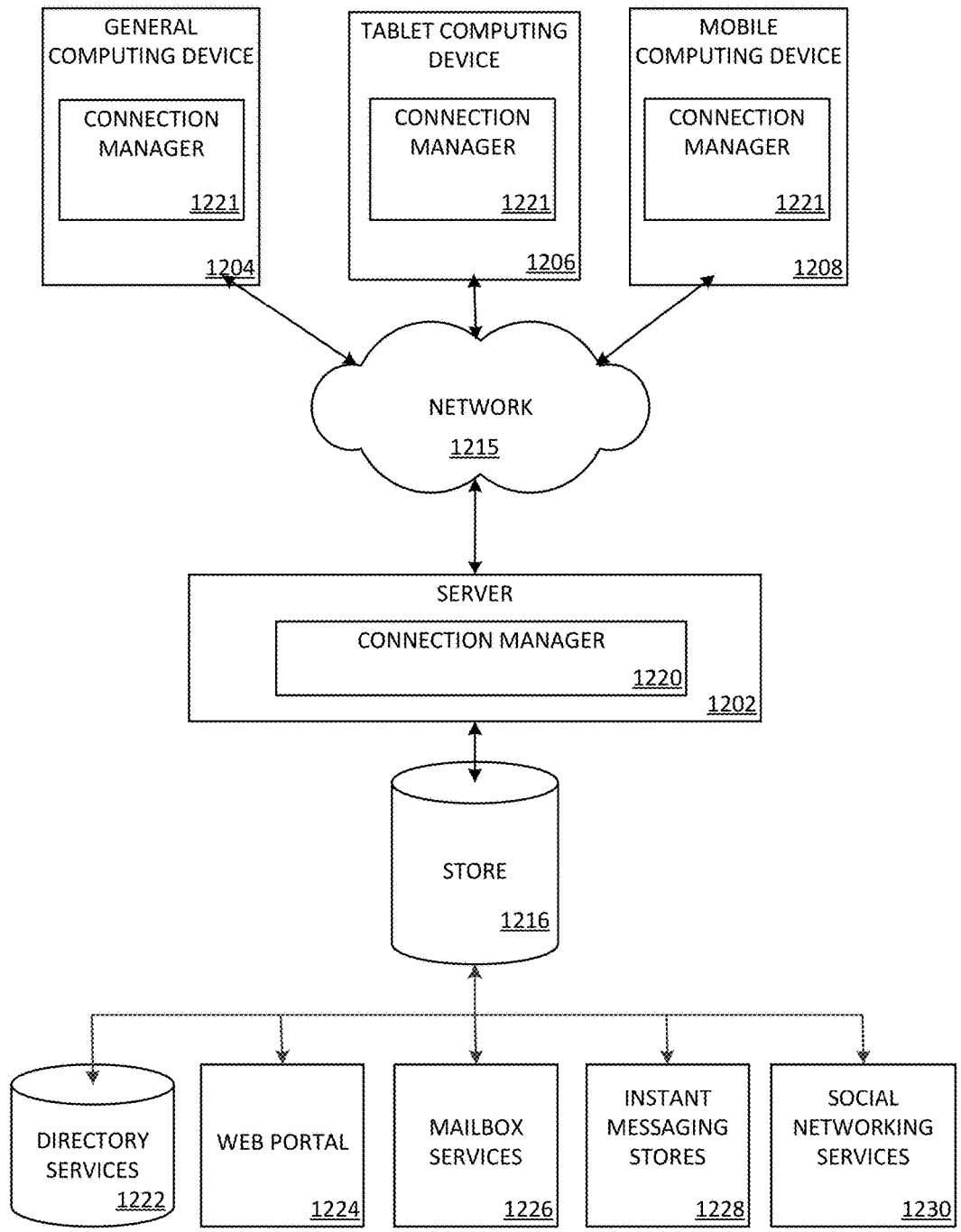
FIG. 12 is a simplified block diagram of a distributed computing system in which aspects of the present disclosure may be practiced.

FIG. 12 illustrates one aspect of the architecture of a system for processing data received at a computing system from a remote source, such as a general computing device 1204 (e.g., personal computer), tablet computing device 1206, or mobile computing device 1208, as described above. Content displayed at server device 1202 may be stored in different communication channels or other storage types. For example, various documents may be stored using a directory service 1222, a web portal 1224, a mailbox service 1226, an instant messaging store 1228, or a social networking service 1230. The connection manager 1221 may be employed by a client that communicates with server device 1202, and/or the connection manager 1220 may be employed by server device 1202. The server device 1202 may provide data to and from a client computing device such as a general computing device 1204, a tablet computing device 1206 and/or a mobile computing device 1208 (e.g., a smart phone) through a network 1215. By way of example, the computer system described above with respect to FIGS. 1-11 may be embodied in a general computing device 1204 (e.g., personal computer), a tablet computing device 1206 and/or a mobile computing device 1208 (e.g., a smart phone). Any of these embodiments of the computing devices may obtain content from the store 1216, in addition to receiving graphical data useable to either be pre-processed at a graphic-originating system or post-processed at a receiving computing system.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 12 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method of connecting a device to a network receiver using Bluetooth Low Energy (BTLE) comprising:
preconfiguring the device to pair with the network receiver via a Bluetooth protocol, wherein the preconfigured pairing comprises storing exchanged data for future auto-connection between the device and the network receiver;
in response to preconfiguring the device to pair with the network receiver, automatically disabling a Wi-Fi scanning operation of the device;
while the Wi-Fi scanning operation is disabled and based on the preconfigured pairing, automatically connecting to the network receiver via the Bluetooth protocol; and
establishing a Wi-Fi connection between the device and the network receiver.

2. The method of claim 1, further comprising:
when the device is within a geographic range of the BTLE signal, automatically establishing the Wi-Fi connection between the device and the network receiver.

3. The method of claim 1, wherein the device comprises one of: a portable device, a tablet, a laptop computer, a desktop computer, and a gaming console.

4. The method of claim 1, wherein the network receiver comprises one of: a wireless router, an Ethernet router, a network adapter, a router/modem combination device, a Miracast device, a Chromecast device, a wireless dock, and an AirPlay device.

5. The method of claim 2, wherein the geographic range for pairing the device to the BTLE signal can be adjusted.

6. The method of claim 2, wherein the Wi-Fi connection between the device and the network receiver is maintained when the device exceeds the geographic range of the BTLE signal.

7. The method of claim 2, wherein the Wi-Fi connection between the device and the network receiver is terminated when the device exceeds the geographic range of the BTLE signal.

8. The method of claim 2, wherein terminating the Wi-Fi connection between the device and the network receiver occurs while the device is within a range of a Wi-Fi signal of the network receiver and outside the geographic range of the BTLE signal of the network receiver.

9. The method of claim 1, wherein multiple devices connect to the network receiver.

10. The method of claim 9, wherein at least one of the multiple devices pairs with the network receiver using the BTLE signal.

11. The method of claim 9, wherein at least one of the multiple devices connects to the network receiver using a Wi-Fi signal.

12. The method of claim 1, wherein the BTLE signal of the network receiver is disabled, further comprising:
connecting to the network receiver via a Wi-Fi signal using a Wi-Fi scanning operation.

13. The method of claim 1, wherein a BTLE capability of the device is disabled, further comprising:
connecting to the network receiver via a Wi-Fi signal using a Wi-Fi scanning operation.

14. The method of claim 1, further comprising:
receiving a selection to enable the Wi-Fi scanning operation of the device.

15. The method of claim 1, wherein automatically establishing the Wi-Fi connection between the device and the network receiver further comprises first establishing a BTLE connection between the device and the network receiver.

16. A device for connecting to an auto-connect capable network receiver using a low energy signal comprising:
at least one processing unit; and
at least one memory encoding computer executable instructions that, when executed by the at least one processing unit, cause the at least one processing unit to perform a method comprising:
preconfiguring the device to pair with a network receiver via the low energy signal, wherein the low energy signal of the network receiver is associated with a geographic range, and wherein the preconfigured pairing comprises storing exchanged data for future auto-connection between the device and the network receiver;
in response to preconfiguring the device to pair with the network receiver, automatically disabling a Wi-Fi scanning operation of the device;
while the Wi-Fi scanning operation is disabled and based on the preconfigured pairing, automatically connecting to the network receiver via the low energy signal; and
establishing a Wi-Fi connection between the device and the network receiver.

17. The system of claim 16, wherein the device comprises a stored list of at least one Bluetooth-compatible paired device.

18. The system of claim 16, further comprising:
maintaining the Wi-Fi connection between the device and the network receiver when the device exceeds the geographic range of the low energy signal of the network receiver.

19. A computer storage device encoding computer executable instructions that when executed by at least one processor, perform a method comprising:
preconfiguring a device to pair with a network receiver via a low energy signal, wherein the low energy signal of the network receiver is associated with a geographic range, and wherein the preconfigured pairing comprises storing exchanged data for future auto-connection between the device and the network receiver;
in response to preconfiguring the device to pair with the network receiver, automatically disabling a Wi-Fi scanning operation of the device;
while the Wi-Fi scanning operation is disabled and based on the preconfigured pairing, automatically connecting to the network receiver via the low energy signal; and
establishing a Wi-Fi connection between the device and the network receiver.

20. The system of claim 16, further comprising:
terminating the Wi-Fi connection between the device and the network receiver when the device exceeds the geographic range of the low energy signal.

* * * * *